United States Patent [19]

Komatsu et al.

[11] Patent Number: 4,901,297
[45] Date of Patent: Feb. 13, 1990

[54] OPTICAL MAGNETIC RECORDING AND REPRODUCING METHOD AND APPARATUS CAPABLE OF PROLONGING A RECORDING TIME

[75] Inventors: Keiichi Komatsu; Shinji Ozaki; Hikaru Masui, all of Katsuta; Ken Kubo, Tokyo, all of Japan

[73] Assignees: Hitachi, Ltd., Tokyo; Hitachi Video Engineering, Inc., Yokohama, both of Japan

[21] Appl. No.: 871

[22] Filed: Jan. 6, 1987

[30] Foreign Application Priority Data

Jan. 10, 1986 [JP] Japan ................................. 61-2070

[51] Int. Cl.$^4$ ...................... G11B 11/12; G11B 13/04; G11B 11/10
[52] U.S. Cl. ...................... 369/13; 360/114; 350/6.7
[58] Field of Search ............ 369/13, 111, 97; 350/6.1, 6.7; 360/114, 59, 10.1; 365/122; 358/208, 206, 312

[56] References Cited

U.S. PATENT DOCUMENTS

| 3,902,048 | 8/1975 | Fleischer et al. | 235/467 |
| 4,318,582 | 3/1982 | Minoura et al. | 358/208 |
| 4,403,250 | 9/1983 | Kellar | 360/10.1 |
| 4,430,675 | 2/1984 | Fujime | 360/10.1 |
| 4,472,748 | 9/1984 | Kato et al. | 360/59 |
| 4,525,828 | 6/1985 | Higashiyama et al. | 369/13 |
| 4,669,070 | 5/1987 | Bell | 369/111 |
| 4,731,659 | 3/1988 | Kani | 358/312 |

FOREIGN PATENT DOCUMENTS

| 58-115602 | 7/1983 | Japan . | |
| 60-214437 | 10/1985 | Japan | 360/114 |

OTHER PUBLICATIONS

Patent abstracts of Japan, vol. 7, No. 266 (p. 239) [1411], Nov. 26, 1983, JP/58-146006 to Okamura.
Patent abstracts of Japan, vol. 7, No. 228 [p. 228][1373] Oct. 8, 1983, JP/58-115602 to Okamura.

Primary Examiner—Steven L. Stephan
Assistant Examiner—Hoa T. Nguyen
Attorney, Agent, or Firm—Antonelli, Terry & Wands

[57] ABSTRACT

An optical magnetic recording and reproducing apparatus and method including an optical beam scanner for scanning a recording medium with an optical beam and forming a track having a predetermined angle with respect to the traveling direction of the recording medium, a magnetic field applying arrangement for applying the magnetic field onto the recording medium, and optical beam generator for generating the optical beam.

9 Claims, 24 Drawing Sheets

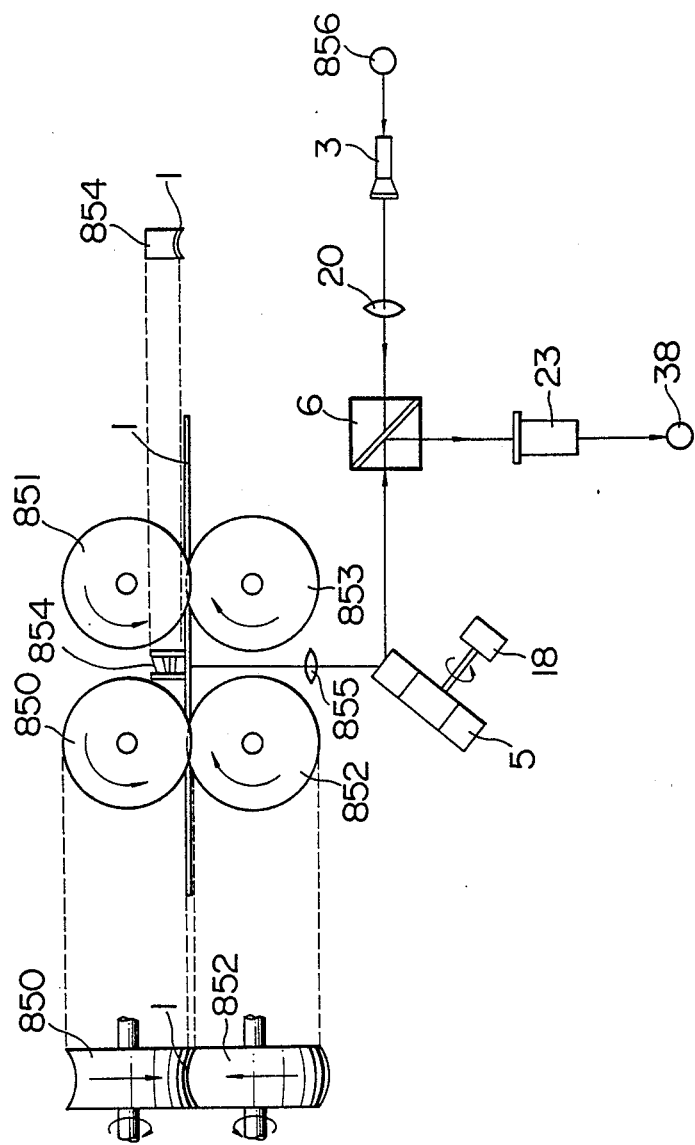

LASER LIGHT SOURCE

TAPE PATTERN  (TRAVELING DIRECTION OF TAPE)

TRACKING VARIATION

OPTICAL MAGNETIC RECORDING AND REPRODUCING METHOD AND APPARATUS CAPABLE OF PROLONGING A RECORDING TIME

BACKGROUND OF THE INVENTION

The present invention relates to an optical magnetic recording and reproducing apparatus and more particularly to an optical magnetic recording and reproducing apparatus and method suitable to efficient recording and reproducing signals on a recording medium having a lengthwise direction such as magnetic tape.

In the past, an optical magnetic recording and reproducing apparatus is described in a paper entitled "Optical Magnetic Recording Technique" by Imamura, Journal of Institute of Television Engineers of Japan, Vol. 39, No. 4, for example.

In the prior art method, however, a recording track is formed in the traveling direction of the recording medium. It has been aimed to prolong the recording time. When magnetic tape is used, for example, the recording track is formed in the lengthwise direction of the magnetic tape. Manipulation such as special reproduction or record head search used for reproduction becomes very difficult.

SUMMARY OF THE INVENTION

An object of the present invention is to provide a scanning method and its signal processing method which are free from the above described drawbacks of the prior art, which facilitate prolonging the recording time, which are stable, and which can be easily manipulated.

For the purpose of prolonging the recording time of an optical magnetic recording and reproducing apparatus, magnetic tape is used, for example. In the prior art system wherein the recording track is formed in the traveling direction of the recording medium, manipulation for reproduction such as special reproduction or head search is difficult. Even if the recording time can be prolonged, therefore, adoption of the prior art in products poses a problem.

In accordance with the present invention, this problem is solved by adopting a system in which recording tracks are formed at a predetermined angle with respect to the lengthwise direction of the recording medium in the same way as conventional video tape recorders.

In accordance with the present invention, a polygonal rotary scanner is used to form a recording track having a predetermined angle with respect to the traveling direction of the recording medium. And tracking control is effected by either rotating the rotary scanner around two arbitrary axes perpendicular to the rotary axis or arbitrarily varying the beam direction of the optical beam generator. Otherwise, tracking control may be effected by a combination of the above described two methods. For attaining erasing which poses a problem in recording operation, the recording light beam is preceded by the erasing beam light, and the sense of the current flowing through the electromagnetic coil is inverted by a changeover pulse track by track. In a track pattern formed thus preceding the recording light beam, all of the magnetic fields contained in one track have the same sense, and the sense of the magnetic field is inverted track by track.

When a polygonal rotary scanner is used to scan a recording medium with light beam, a part having no signals recorded thereon is caused because of irregular reflection of light beam incurred in the vicinity of the apex of the polygonal rotary scanner. Occurrence of such a part is coped with by effecting time base compression using the memory during recording and generating a section having no signals in the vicinity of the apex.

BRIEF DESCRIPTION OF THE DRAWINGS

FIG. 21 is a block diagram showing another embodiment of the portion for making the recording medium travel.

DESCRIPTION OF THE PREFERRED EMBODIMENTS

Figure 1:
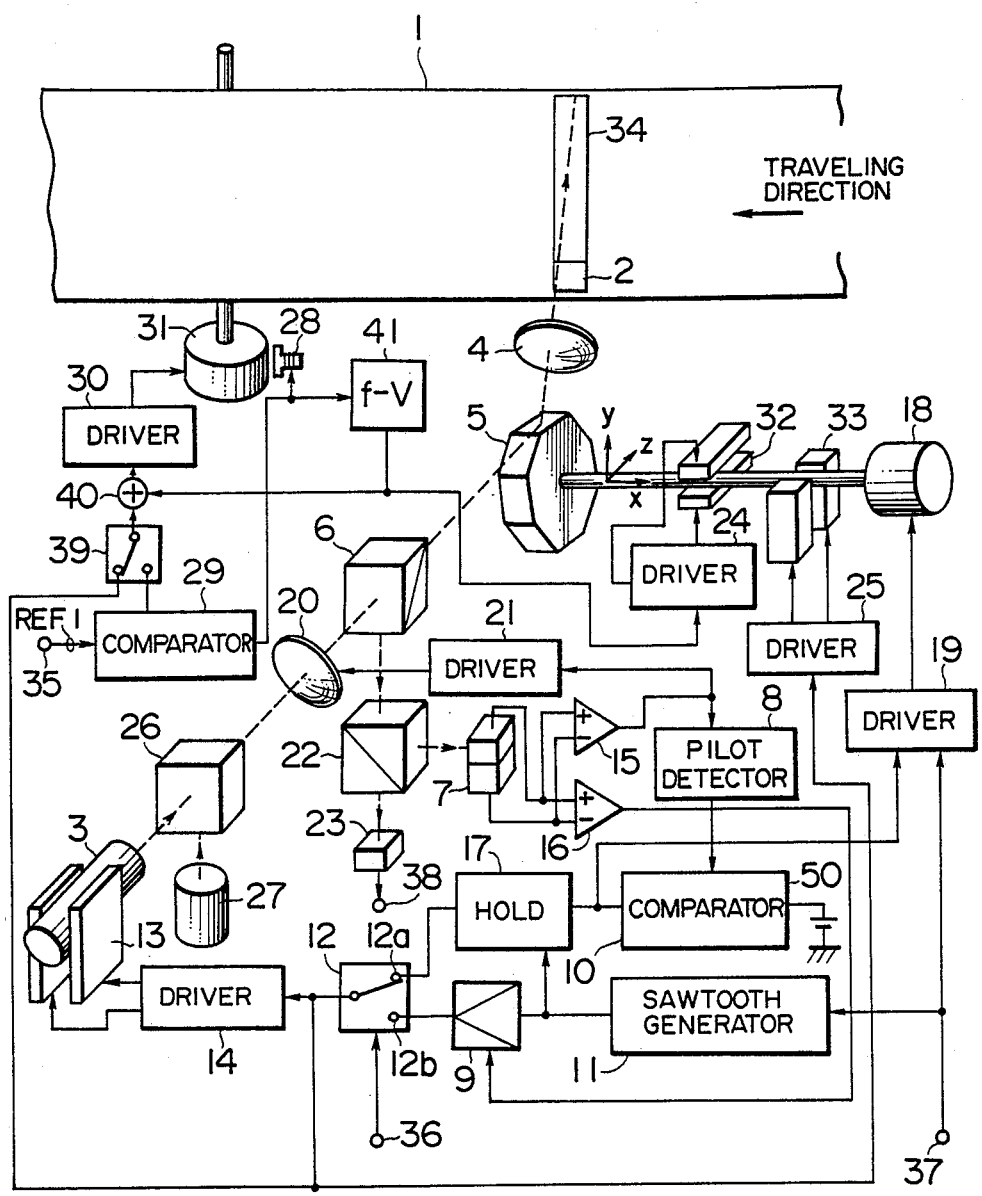
FIG. 1 is a block diagram showing the entire system configuration of an optical magnetic recording and reproducing apparatus according to the present invention.

In FIG. 1 showing an embodiment of the present invention, a recording medium 1 whereon signals are recorded by means of optical magnetic recording technique, a recording and reproducing laser oscillator 3, a focus lens 20, a polygonal rotary scanner 5 for scanning the recording medium with a laser beam, a track 34 formed when the recording medium 1 is scanned with the laser beam, a pilot information recording section 2 recorded on a part or the whole of the track 34 for tracking control, an erasing laser oscillator 27, a beam splitter 26 for transmitting the erasing laser beam into a direction different from the incident direction, a beam splitter 22 for splitting into two directions the optical axis of the reflected light taken out from the beam splitter 6, a detector 23 for detecting the optical magnetic signal out of the reflected light supplied from the recording medium 1 during the reproduction operation, an output terminal 38 for sending out the reproduction signal supplied from the optical magnetic signal detector 23, a detector 7 for detecting the pilot signal, tracking information and focusing information out of the reflected light supplied from the recording medium 1, a subtracter 16 for deriving the tracking information by effecting subtraction between two outputs of the detector 7, an adder 15 for deriving the pilot signal and the focusing information by adding two outputs of the detector 7, a driver 21 for controlling the focus lens 20 on the basis of the output of the adder 15, a detector 8 for detecting the pilot signal level on the basis of the output of the adder 15 and sending out voltage according to the pilot signal level, a comparator circuit 10 for comparing the output voltage of the pilot signal detector 8 with reference voltage and for sending out a signal indicating that the pilot signal has been detected when the output voltage of the pilot signal detector 8 exceeds the reference voltage, a driver 19 for driving the motor 18 to rotate the polygonal rotary scanner 5 in synchronism with the output of the comparator circuit 10 and the track changeover signal supplied from an input terminal 37, a circuit 11 for generating sawtooth waveform in synchronism with the track changeover signal supplied from the input terminal 37, a hold circuit 17 for sending out the output of the sawtooth generator circuit 11 as it is when the output of the comparator circuit 10 is absent and holding the output of the sawtooth generator circuit 11 when the output of the comparator circuit 10 has appeared, a sawtooth waveform amplitude adjusting circuit 9 for adjusting the output amplitude of the sawtooth generator during the special reproduction on the basis of the tracking information sent out from the subtracter 16, a switch 12 for selecting either the normal reproduction or the special reproduction on the basis of a signal supplied from an input terminal 36, a piezoelectric displacing unit driver 14 for driving a piezoelectric displacing unit 13 on the basis of the output of the switch 12, a piezoelectric displacing unit 13 for varying the direction of the optical axis of the laser beam sent out from the laser oscillator 3, a piezoelectric displaying unit 33 for rotating the rotation axis of the polygonal rotary scanner 5 around the illustrated y axis, a piezoelectric displacing unit 32 for rotating the rotation axis of the polygonal rotary scanner 5 around the illustrated z axis, a driver 25 for driving the piezoelectric displacing unit 33 on the basis of the output of the switch 12, a recording medium feed driving unit 31 for making the recording medium 1 travel in a direction indicated by an arrow, a frequency generator 28 for detecting the driving speed of the driving unit 31, a frequency-to-voltage converter 41 for converting a frequency signal sent out from the frequency generator 28 to a voltage signal, a driver 24 for driving the piezoelectric displacing unit 32 on the basis of the output of the converter 41, a comparator 29 for comparing the output of the frequency generator 28 with a signal having a reference frequency supplied from an input terminal 35, a recording/reproduction changeover switch 39, an adder 40 for adding the output of the switch 39 and the output of the frequency-to-voltage converter 41, and a driver 30 for driving the driving unit 31 on the basis of the output of the adder are illustrated. Numeral 357 (FIG. 9B) is means for applying a magnetic flux to the recording medium 1.

The operation of the circuit shown in FIG. 1 will now be described with respect to the recording operation at first. The laser light emitted from the laser oscillator 3 is applied onto the polygonal rotary scanner 5 through the beam splitter 26, the focus lens 20 and the beam splitter 6.

The laser light reflected by the polygonal rotary scanner 5 passes through the optical path correction lens 4 to form a spot on the recording medium, optical magnetic recording being effected. The optical path correction lens 4 is used to make the laser light strike against the recording medium 1 at a right angle. Since the polygonal rotary scanner 5 rotates around the x axis, a track 34 which is a locus of the optical beam is formed on the recording medium. Since tracks 34 are recorded on the recording medium 1 one after another, the recording medium 1 is moved by the recording medium feed driving unit 31 in the direction indicated by the arrow. The recording medium feed driving unit 31 is subject to servocontrol as illustrated. That is to say, the switch 39 assumes the position which is opposite to that shown in FIG. 1. Phase control is so effected by using the comparator 29 that the frequency of the signal FG of the frequency generator 28 attached to the driving unit 31 may coincide with the frequency of the predetermined reference signal REF1 supplied from the input terminal 35. That is to say, voltage corresponding to the phase different between FG and REF1 is supplied to the adder 40 to drive the recording medium feed driving unit 31 through the driver 30. As a result, the recording medium 1 travels in the direction of the arrow. In addition, the precision in control may be raised by adding the frequency of the frequency generator 28 to the adder 40 in the above described control loop through the frequency-to-voltage converter 41. Since the above described servocontrol is known in the art of a magnetic recording and reproducing unit, it will not be described in detail.

Figure 2:
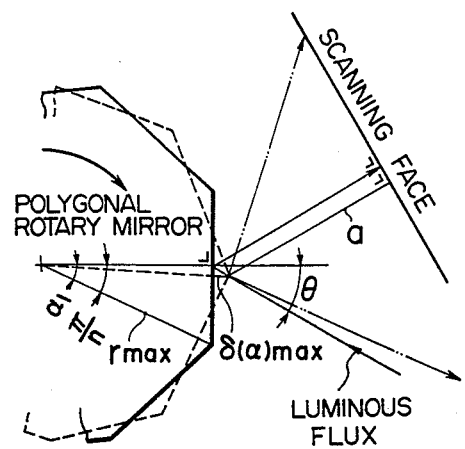
FIG. 2 is a schematic diagram showing a polygonal rotary scanner and scanning of a recording medium.

In accordance with the present invention, the recording track is formed nearly on a linear line at a predetermined angle with respect to the traveling direction of the recording medium 1 as illustrated. The reason will now be described by referring to FIG. 2. In FIG. 2, the number n of sides of the polygonal rotary scanner, a rotation angle $\alpha$ of the polygonal rotary scanner ($\alpha=0$) when the luminous flux is incident upon the center of the reflex mirror face), maximum radius $r_{max}$ of the polygonal rotary scanner, and an incident angle $\theta$ when the luminous flux is applied to the center of the reflex face are illustrated. Assuming now that the movement distance of the light spot on the recording medium caused by the rotation of the polygonal rotary scanner 5 is y(x), it follows that $$\text{if } -\alpha_1 \leq \alpha \leq 0 \quad (1)$$

then $$y_1(\alpha) = \{a + \delta(\alpha) \cos 2\theta\} \tan 2\alpha - \{\delta(\alpha)_{max} - \delta(\alpha)\} \sin 2\theta$$

$$\text{if } 0 \leq \alpha \leq \frac{2\pi}{n} - \alpha_1 \quad (2)$$

$$y_2(\alpha) = \{a + \delta(\alpha) \cos 2\theta\} \tan 2\alpha + \{\delta(\alpha)_{max} - \delta(\alpha)\} \sin 2\theta.$$

This results in a nearly linear line.

Optical magnetic recording onto the recording medium 1 becomes thus possible. And the recording track is formed at a predetermined angle with respect to the traveling direction of the recording medium 1.

Subsequently, the reproduction operation will now be described. The laser light emitted from the laser oscillator 3 is reflected by the recording medium 1 and applied to the beam splitter 6 through the optical path correction lens 4 and the polygonal rotary scanner 5. The laser light applied to the beam splitter 6 is changed to the perpendicular direction and applied to the optical magnetic signal detector 23 through the beam splitter 22. The signal detected by the optical magnetic signal detector 23 is sent out from the signal output terminal 38. As a matter of course, the track on the recording medium can be scanned during the reproduction as well by rotating the polygonal rotary scanner 5 around the illustrated x coordinate axis in the same way as the recording operation.

Reproduction tracking which is one feature of the present invention will now be described by referring to FIG. 1. During the reproduction operation as well, the feed speed of the recording medium 1 undergoes servocontrol using a method described later. Because of disturbance or speed drift of the traveling system, however, it is difficult to keep the feed speed constant. Accordingly, the track recorded on the recording medium 1 is not provided with constant pitch. Since the information is read out from indeterminate pitches during the reproduction operation, faulty tracking causes deterioration in the S/N of the information or even missing information. As a countermeasure to this problem, pilot information is recorded together with the principal information recorded on the recording medium 1. For example, the pilot information is recorded on the pilot information recording section 2 disposed on the extension of the recording track 34 in a pattern different from that of the principal information as shown in FIG. 1. The pilot information is sensed to provide the laser light with the track scanning function.

As the reflected light of the laser oscillator 3, the pilot information is led to the beam splitter 22 through the optical path correction lens 4, the polygonal rotary scanner 5 and the beam splitter 6. The pilot information is thus detected by the pilot optical detector 7 disposed in a direction perpendicular to the optical magnetic signal detector 23. The pilot detector 7 is divided into two halves, whose outputs are supplied to the adder 15 and the subtracter 16. The output of the adder 15 is supplied to the focus servo circuits and the pilot detection circuit. The output of the subtracter 16 is supplied to the tracking circuit for special reproduction. The signal resulting from addition in the adder 15 is supplied to the comparator circuit 10 through the pilot detector circuit 8. In the comparator circuit 10, the reference voltage is compared with the detected voltage. When the detected voltage is larger than the reference voltage, the hold circuit 17 is activated to hold the output voltage of the sawtooth generator circuit 11. Under normal conditions, the hold circuit 17 is in the OFF state. The signal generated by the sawtooth generator circuit 11 is supplied to the piezoelectric displacing unit 13 through the changeover circuit 12 and the piezoelectric displacing unit driver circuit 14. During the normal reproduction operation, the changeover circuit 12 assumes the illustrated position. The piezoelectric displacing unit 13 moves the laser oscillator 3 in the direction of the rotation axis x of the polygonal rotary scanner 5. The piezoelectric displacing unit 13 and the laser oscillator 3 constitute a single body. Piezoelectric ceramics of PbZr system, for example, can be used for the piezoelectric displacing unit 13. Signals from the driver 14 supplies the piezoelectric displacing unit 13 with voltages having opposite polarities to vary the laser oscillator 3 in the traveling direction of the recording medium 1 by using two pieces of piezoelectric ceramics. When the track 34 recorded on the recording medium 1 is disposed on a position displaced from the normal track, therefore, the laser oscillator 3 is moved by the sawtooth waveform to move the laser light on the recording medium. If it is detected by the comparator circuit 10 that the signal supplied from the pilot information recording section has a proper level, the voltage generated by the sawtooth generator circuit 11 is held in the hold circuit 17. The voltage thus held is supplied to the piezoelectric displacing unit driver 14 through the changeover circuit 12. And the output of the comparator circuit 10 is supplied to the scan motor driver 19 together with the track changeover signal supplied from the input terminal to effect the rotation phase control. Thus it becomes possible to read the recording track 34.

During the reproduction operation as well, the recording medium feed driving unit 31 is subject to servocontrol as shown in FIG. 1. That is to say, the switch 39 assumes the illustrated position during the reproduction, and the error signal is supplied thereto from the tracking servocontrol circuit. The frequency of the frequency generator 28 attached to the driving unit 31 is supplied to the frequency-to-voltage converter 41. The resultant voltage signal is added to the above described error signal in the adder 40 to control the driving unit 31 via the driver 30. The error signal fed back to the driving unit comprises only the DC component. The AC component of the tracking error signal is supplied to the piezoelectric displacing unit driver 14 to effect tracking servocontrol.

Subsequently, application of the apparatus to special reproduction (so-called still function and search function) will now be described. During the special reproduction, the laser light must be moved by the amount of the feed speed vector of the medium when the recording track 34 is scanned by the polygonal rotary scanner 5.

Figure 3:
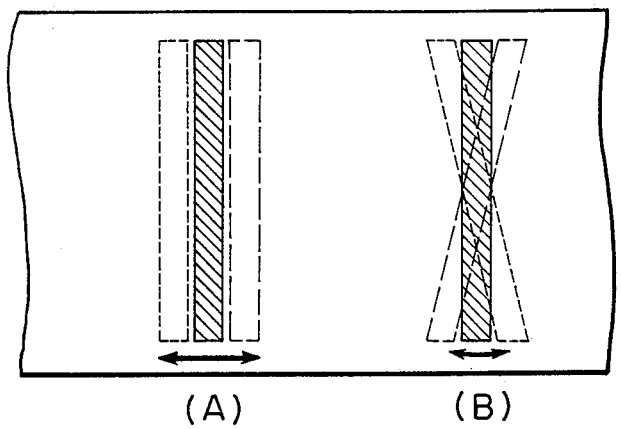
FIG. 3 is a pattern diagram showing the track pattern on a recording medium.

When the proper level of the pilot signal has been detected by the comparator circuit 10 as a result of driving the piezoelectric displacing unit 13, the changeover circuit 12 assumes the position opposite to that illustrated. The outputs of the bisected pilot optical detector 7 undergo subtraction in the subtracter 16 and are supplied to the sawtooth waveform amplitude adjusting circuit 9. The output voltage of the sawtooth generator circuit is adjusted in the adjusting circuit 9 in accordance with the subtracter output and supplied to the piezoelectric displacing unit driver 14 via the changeover circuit 12. Even in the special reproduction, the normal track is thus scanned. This will now be simply described by referring to a track pattern diagram of FIG. 3. FIG. 3(A) is a track pattern diagram obtained under the condition that the optical axis of the laser light is slightly changed by the piezoelectric displacing unit 13. The shaded track represents the scanning locus obtained under the condition that the optical axis is not changed. The block surrounded by the dotted line or broken line represents the scanning locus obtained under the condition that the optical axis of the laser light is varied by the piezoelectric displacing unit 13. As evident from FIG. 3(A), the scanning locus of the laser light can be arbitrarily moved in parallel to the traveling direction of the recording medium 1.

On the other hand, FIG. 3(B) is a track pattern diagram obtained under the condition that the output signal of the sawtooth generator circuit 11 drives the piezoelectric displacing unit 13 to slightly change the optical axis of the laser light. The shaded track represents the scanning locus obtained under the condition that the optical axis is not changed. The block surrounded by the dotted line or broken line is a scanning locus obtained under the condition that the optical axis of the laser light is changed by the output signal of the sawtooth generator circuit 11. As evident from FIG. 3(B), the scanning locus of the laser light can be rotated clockwise or counterclockwise by an arbitrary angle.

As described above, the scanning locus of the laser beam on the recording medium can be arbitrarily controlled.

In accordance with the present invention, the polygonal rotary scanner 5 may be arbitrarily rotated around the coordinate z axis (the axis perpendicular to the recording medium face) or the y axis (the axis perpendicular to the x axis and the z axis) to effect tracking.

If the polygonal rotary scanner 5 is varied around the y axis, therefore, the scanning locus of the laser light can be arbitrarily moved in parallel to the traveling direction of the recording medium 1. By applying the tracking error signal to the piezoelectric displacing unit 33 through the piezoelectric displacing unit driver 25, positions where the pilot information become proper can be scanned in the same way as the above described laser oscillator 3.

If the polygonal rotary scanner 5 is varied around the z axis, the scanning locus of the laser light can be rotated clockwise or counterclockwise by an arbitrary angle. The so-called tracking control for the special reproduction can thus be effected.

This will now be simply described by referring to the track pattern diagram of FIG. 3.

FIG. 3(A) is a track pattern diagram obtained under the condition that the rotation axis is slightly varied around the y axis. The shaded track is the scanning locus under the condition that the rotation axis of the polygonal rotary scanner 5 is not varied. The block surrounded by the dotted line or broken line is the scanning locus obtained under the condition that the rotation axis of the polygonal rotary scanner 5 is varied around the y axis. As evident from FIG. 3(A), the scanning locus of the laser light can be arbitrarily moved in parallel to the traveling direction of the recording medium 1 by varying the rotation axis of the polygonal rotary scanner 5 around the y axis. On the other hand, FIG. 3(B) is a track pattern diagram obtained under the condition that the rotation axis of the polygonal rotary scanner 5 is slightly varied around the z axis. The shaded track is the scanning locus obtained under the condition that the rotation axis of the polygonal rotary scanner 5 is not varied. The block surrounded by the dotted line or the broken line is the scanning locus obtained under the condition that the rotation axis of the polygonal rotary scanner 5 is varied. As evident from FIG. 3(B), the scanning locus of the laser light can be rotated clockwise or counterclockwise by an arbitrary angle by varying the rotation axis of the polygonal rotary scanner 5 around the z axis.

Figure 4:
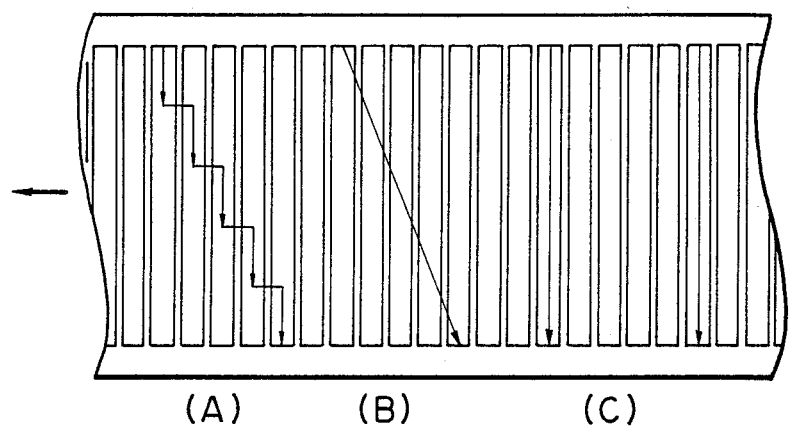
FIG. 4 is a schematic diagram showing the track scanning in special reproduction.

The search reproduction will now be described by referring to FIG. 4. The search at five-time-speed will now be described as an example. FIG. 4(A), (B) and (C) show search methods. In the system of FIG. 4(A), the adjacent track is selected every time one fifth of the track has been scanned. In FIG. 4(B), five tracks are scanned slantly. In the system of FIG. 4(C), every five tracks are scanned. Every system can be dealt with by varying the optical axis of the output laser of the above described laser oscillator 3 or by varying the rotation axis of the polygonal rotary scanner 5.

As described above, the present invention assures the tracking control in the optical magnetic recording and reproducing apparatus including that for the special reproduction such as double speed mode.

Figure 5A:
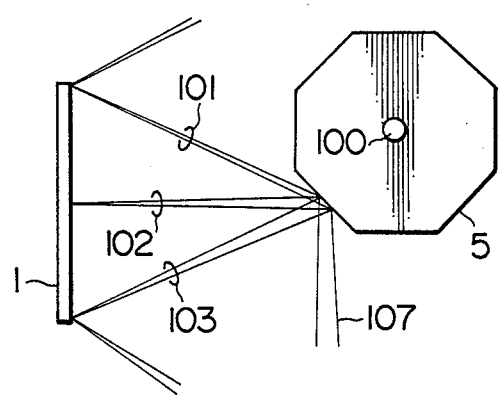
FIGS. 5A and 5B are schematic diagrams showing the relationship between the rotary scanner and an optical path correction lens.
Figure 5B:
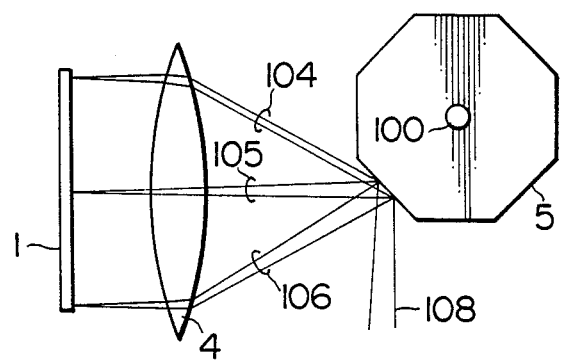

The reason why the optical path correction lens 4 is used in FIG. 1 will now be described by referring to FIG. 5. In FIG. 5, the polygonal rotary scanner 5, the rotation axis 100 of the polygonal rotary scanner, the recording medium 1, the optical path correction lens 4, and laser beams 101 to 108 are illustrated. At first, the case where the optical path correction lens is absent will now be described by referring to FIG. 5A. The optical axis of the laser beam 107 is varied by the polygonal rotary scanner 5 rotating around the center axis 100, resulting in a laser beam varied from 101 to 103. The recording medium 1 is thus scanned. Since the laser beam 102 has an optical axis perpendicular to the recording medium 1, the laser beam 102 is reflected by the recording medium 1 and transmitted through the optical system in the opposite direction to convey the focusing and tracking information to the detector 7. In case of the laser beams 101 and 103, however, the reflected light does not come back because those laser beams are not perpendicular to the recording medium 1. Accordingly, the laser beam cannot be focused during the recording operation and the information cannot be reproduced at all during the reproduction operation, problems being posed. It is now assumed that the optical path correction lens 4 is used as shown in FIG. 5B. In FIG. 5B, the laser beam 108 is varied in optical axis by the polygonal rotary scanner 5 as represented by laser beams 104, 105 and 106. However, the laser beams 104, 105 and 106 are always applied to the recording medium 1 by the optical axis correction lens 4, the above described problem being solved.

Figure 6A:
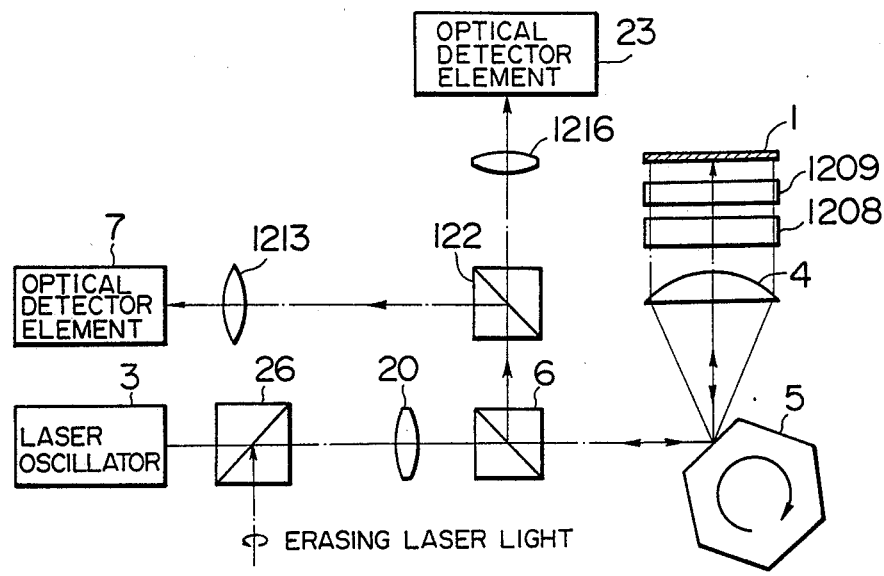
FIGS. 6A and 6B are schematic diagrams showing other embodiments of the present invention using cylindrical tracking lenses.
Figure 6B:
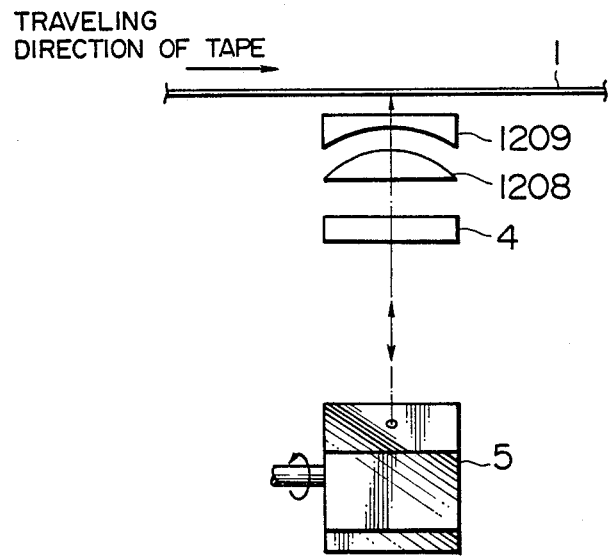

FIG. 6 shows another embodiment of tracking system according to the present invention. The system of FIG. 6 includes a tracking lens 1208 for tracking the track pattern of the recording medium 1, an optical path correction lens for correcting the optical path of the laser light, and condensers 1213 and 1216. Other numerals are included in FIG. 1 as well. FIG. 6B is a configuration diagram seen from the side where the laser light is applied from the laser oscillator 3 to the scanner 5. Since the recording and reproduction operation is effected in the same way as FIG. 1, its description will be omitted. The system of FIG. 6 is characterized in that a cylindrical tracking lens 1208 and an optical path correction lens 1209 are provided for the purpose of special reproduction tracking. The lenses 1208 and 1209 have a lengthwise direction and serve as an optical element having no refractive power in the lengthwise direction thereof and having refractive power in a direction substantially perpendicular to the lengthwise direction thereof with the lenses being arranged at a predetermined angle with respect to the traveling direction of the tape. This will now be described in detail by referring to FIG. 7. It is now assumed that in normal reproduction operation the scanning locus of the laser light is nearly perpendicular to the traveling direction of the tape as shown in FIG. 7(A), for example.

It is now assumed that the reproduction speed is varied. In order to accurately scan the recorded track when reproduction is to be effected at several times the normal traveling speed, the locus of the laser light on the recording medium 1 must have an angle which equals to the sum of a predetermined angle with respect to the traveling direction of the tape and an angle corresponding to the change in traveling speed as shown in FIG. 7(B).

Figure 7:
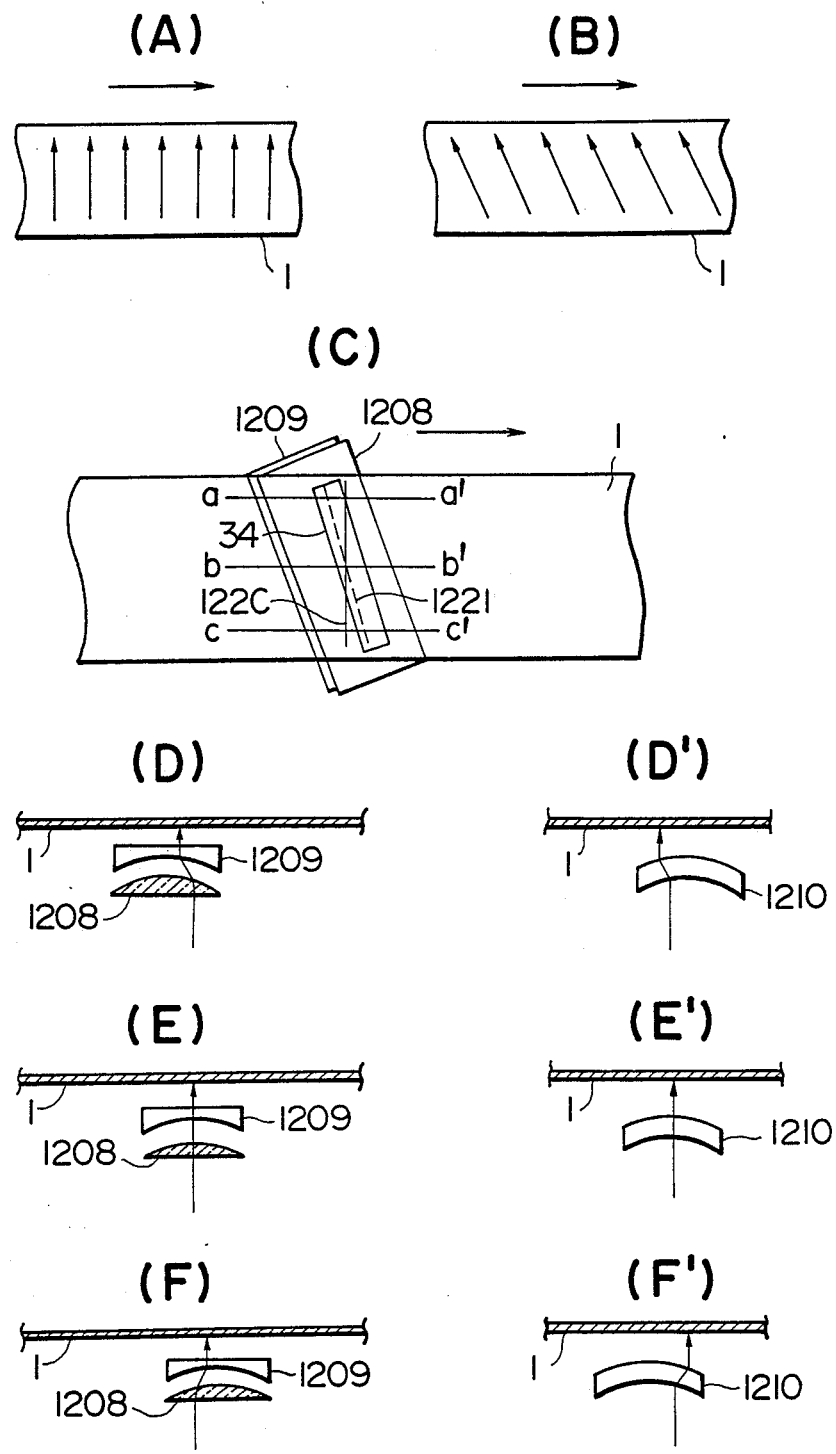
FIG. 7(A) to (F') are schematic diagrams showing the relationship between the cylindrical lens and the scanning position of the recording medium.

In the present embodiment, therefore, it is possible to make the laser light follow the recording track 34 by disposing the tracking lens 1208 and the optical path correction lens 1209 as if those lenses had been rotated by an angle around the axis perpendicular to the recording medium face as shown in FIG. 7(C). The reason why the above described tracking is possible will now be described simply by referring to FIG. 7. Because of the tape speed and the scanning speed of the laser light, the recording track 34 is slant with respect to the scanning of the laser light effected during normal reproduction as shown in FIG. 7(C). The locus 1220 of the laser light applied to the tracking lens 1208 is nearly perpendicular to the traveling direction of the tape. FIGS. 7(D), 7(E) and 7(F) are sectional views seen along planes which are perpendicular to the recording medium and which pass through lines a-a', b-b', and c-c', respectively. Since the laser light applied to the vicinity of the upper end of the tape enters the lens 1208 at the right side with respect to the center as shown in FIG. 7(D), such laser light is refracted to the left and corrected by the optical path correction lens 1209 to strike against the tape 1 at a right angle. Since the laser light applied to the center of the tape passes through the centers of the lenses 1208 and 1209 as shown in FIG. 7(E), it goes straight ahead as it is. Since the laser light applied to the vicinity of the lower end of the tape enters the lens 1208 at the left side with respect to the center as shown in FIG. 7(F), such laser light is refracted to the right and corrected by the optical path correction lens 1209 to strike against the magnetic tape 1 at right angle. Accordingly, it is possible to make the locus 1221 of the laser light on the magnetic tape follow the recording track as shown in FIG. 7(C).

High precision tracking is attained by controlling the gradient of the lenses 1208 and 1209 depending upon the above described servocontrol signal on the basis of the reproduced signal information.

In the above described embodiment, not only tracking at the normal tape speed but also tracking at a variable tape speed can be easily conducted by moving the lenses 1208 and 1209. In FIG. 7(D') to 7(F'), a lens 1210 obtained by combining the tracking lens 1208 and the optical path correction lens 1209 used in FIG. 7(D) to 7(F) as a single body. In this case, tracking as described before can be effected by rotating the lens 1210 in the direction opposite to that of FIG. 7(D) to 7(F).

Erasing in the optical magnetic recording and reproducing apparatus which poses a problem during recording will now be described.

Figure 8:
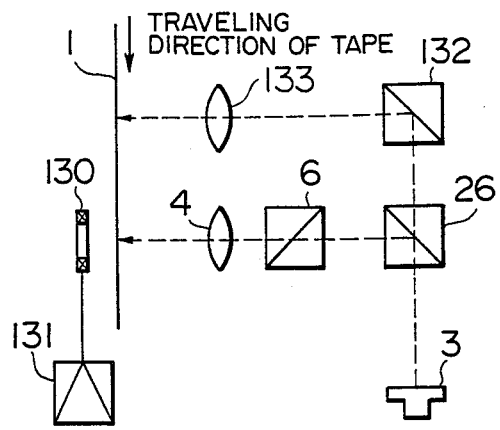
FIG. 8 is a schematic diagram showing the erasing system of a magnetic field modulation system.

Erasing in the optical magnetic recording and reproducing apparatus wherein the external magnetic field is modulated by the recording signal will now be described by referring to FIG. 8. An electromagnetic coil 130 for producing a magnetic field modulated by the recording signal, a recording amplifier 131 for supplying the modulated signal to the electromagnetic coil 130, a reflex mirror 132 used for erasing, and an iris lens 133 are illustrated in FIG. 8. Other numerals denote identical components of FIG. 1. In FIG. 8, however, components of FIG. 1 which matter little in the explanation of erasing operation such as the rotary scanner 5 and the optical detector are omitted.

When only the information signal of a particular section on the recording medium is to be rewritten in the optical magnetic recording and reproducing apparatus, it poses a problem to erase signals already recorded. For this erasing operation, erasing laser light preceding the recording laser light is needed. In FIG. 8, this erasing laser light is obtained from the recording laser oscillator without using a special erasing laser oscillator. That is to say, the laser beam emitted from the laser oscillator 3 is split into the recording laser beam and the erasing laser beam by the beam splitter 26. The erasing laser light going straight ahead through the beam splitter 26 is reflected by the reflex mirror 132 to form a spot on the recording medium 1 via the iris lens 133. By the above described configuration, the preceding erasing laser light can be realized with good cost performance.

It is a matter of course that the spot of the erasing laser light must be wider than the spot of the recording laser light so as not to leave an unerased part.

Erasing operation in the optical magnetic recording and reproducing apparatus wherein the external magnetic field is constant and the recording laser beam is modulated by the recording signal will now be described by referring to FIG. 9. Since the configuration of FIG. 9 is the same as that of FIG. 1 excepting the electromagnetic coil, it will not be described.

Figure 9A:
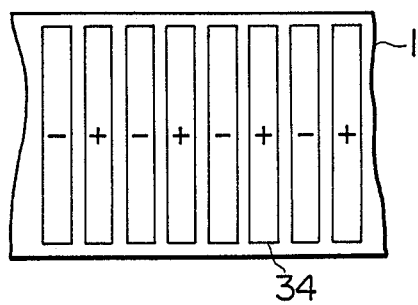
FIGS. 9A, 9B and 9C are schematic diagrams showing the erasing system of an optical modulation system.
Figure 9B:
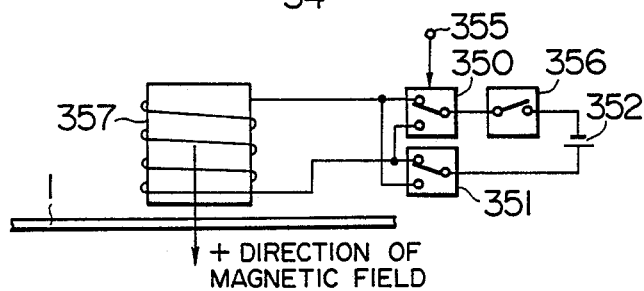
Figure 9C:
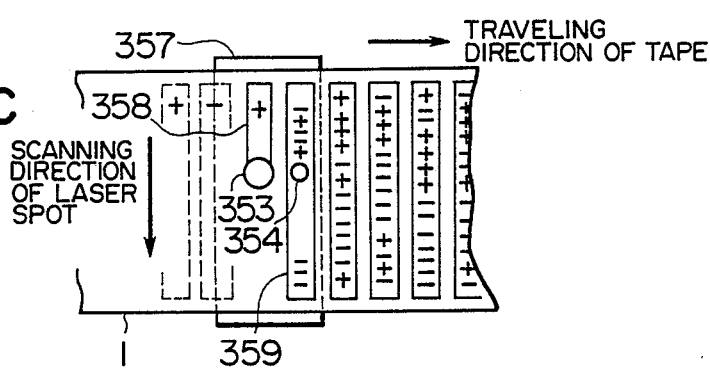

In FIG. 9A, a track pattern 34 is formed on the recording medium 1. In FIG. 9B, an optical magnetic recording electromagnetic coil 357, an input terminal 355 for track changeover pulse, switches 350 and 351 simultaneously changed over by the track changeover pulse supplied from the input terminal 355, a voltage source 352 for electromagnetic coil, and a switch 356 for stopping the magnetic field of the electromagnetic coil 357 are illustrated. In FIG. 9C, numeral 354 denotes a laser spot for recording and reproduction, and numeral 353 denotes a laser spot for erasing during the recording operation. The erasing laser spot 353 is formed by the laser oscillator 27 shown in FIG. 1 through the same optical system as the recording and reproducing laser spot 354.

The track pattern of FIG. 9 is characterized in that when the information signal to be recorded is absent, i.e., in case of no modulation, all of the magnetic fields within a track have the same direction, and the sense of the magnetic field is inverted track by track. Signs + and − of the track pattern 34 shown in FIG. 9A represent senses of the magnetic field of the track. The sense indicated by an arrow of FIG. 9B is represented by + and the opposite sense is represented by −. The sense of the magnetic field is inverted by inverting the direction of the current flowing through the electromagnetic coil 357 by means of the changeover pulse during the recording operation as shown in FIG. 9B.

At first, the recording operation will now be described. The electromagnetic coil is not less than two tracks in width, and the erasing laser spot 353 is applied onto the recording medium 1. The track 358 is erased in + direction by the erasing laser spot 353 and the magnetic field of the electromagnetic coil 357. Since a track 359 adjacent to the track 358 in the traveling direction precedes the track 358 by one track, the track 359 is erased in the − direction. When the laser light modulated by the information signal is applied onto the recording medium 1, therefore, bits of +direction are recorded by the laser spot 354 and the electromagnetic coil 357 on the basis of the modulating signal. That is to say, binary signals + and − are recorded within one track.

During the reproduction operation, the erasing spot 353 is not applied, and the electromagnetic coil 357 does not produce the magnetic field. That is to say, reproduction is effected by the recording and reproducing spot 354. Since bits are inverted track by track, however, correction must be effected in the reproduction signal processing circuit.

By using the above described embodiment of FIG. 9, it is possible to realize an optical magnetic recording and reproducing apparatus which facilitates recording operation concurrently with the erasing operation and which is completely free from problems of overlap writing caused during the recording operation, phase match recording and information inserting.

Reproduction tracking in the optical magnetic recording and reproducing apparatus according to the present invention effected after recording operation of FIG. 9 will now be described by referring to FIGS. 10, 11 and 12.

Figure 10:
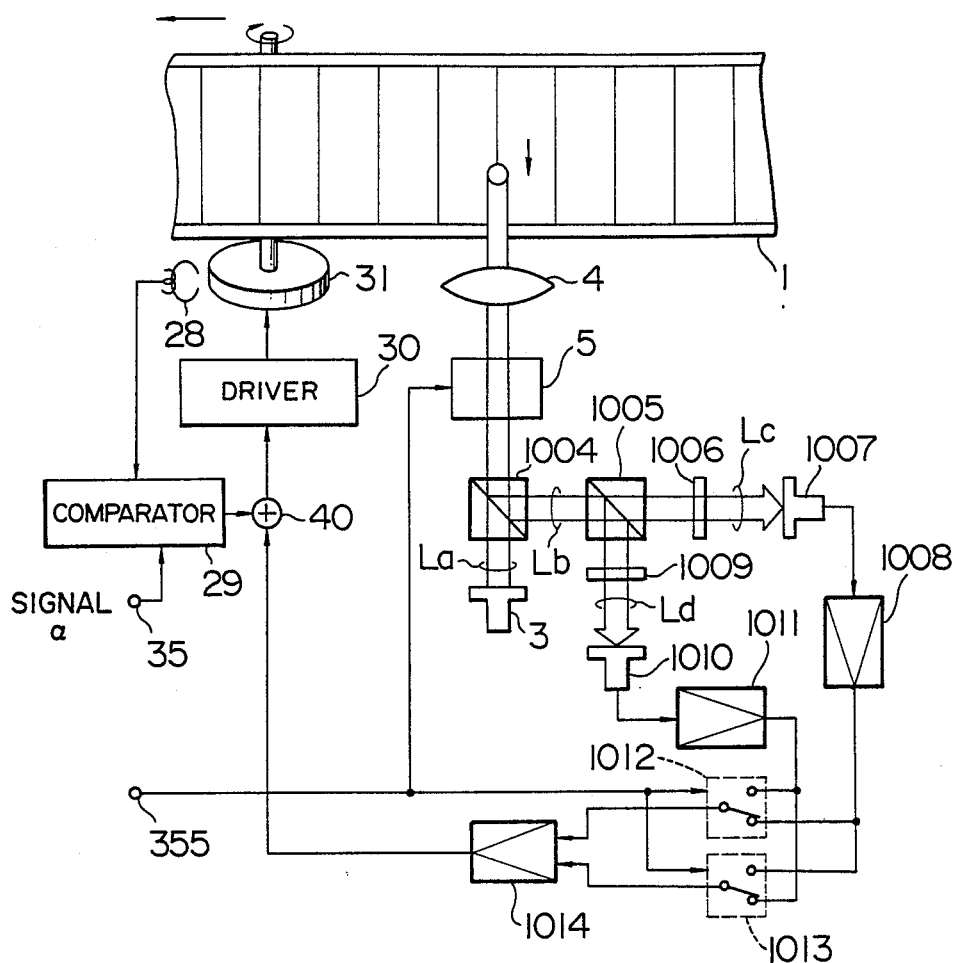
FIG. 10 is a schematic diagram showing another tracking control system according to the present invention.
Figure 11:
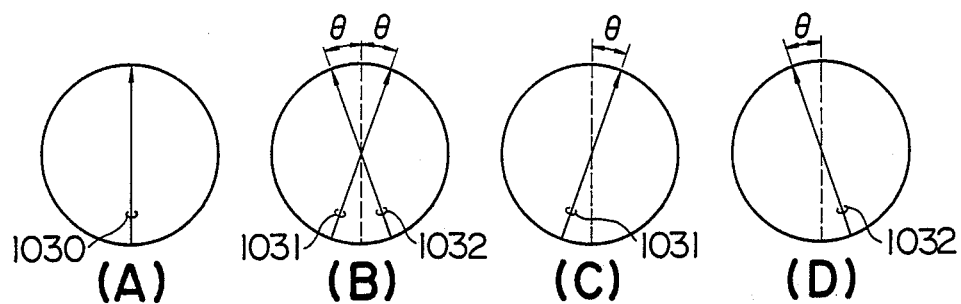
FIG. 11(A) to (D) are schematic diagrams showing linear polarization at various parts of FIG. 10.

FIG. 10 is a block diagram of a tracking control apparatus. FIG. 11 shows linear polarization at various parts of FIG. 10. FIG. 12 shows how the spot of the laser beam for tracking scans the recording track on the recording medium.

In FIG. 10, a recording medium 1, a driving unit 31 for making the recording medium travel in a direction indicated by an arrow, a frequency generator 28 of the driving unit 31, a comparator 29 for comparing the output of the frequency generator 28 with a reference frequency signal α supplied from the input terminal 35, a driver 30 for driving unit, switches 1012 and 1013 changed over by a binary-valued signal "H" or "L", a laser oscillator 3, half mirrors 1004 and 1005 for reflecting the light corresponding to 50% of the incident light, a rotating mirror 5 including driving system for scanning the light ray emitted from the laser oscillator 3 in a direction intersecting the traveling direction of the recording medium 1 at a predetermined angle, an optical path correction lens 4 for focusing the light ray emitted from a laser oscillator 1001 onto the surface of the recording medium 1, analyzers 1006 and 1009, photodetectors 1007 and 1010 for converting the quantity of light into electrical signals, amplifiers 1008 and 1011 for sending out electric signals derived from optical detectors 1007 and 1010 as direct current voltage, a differential amplifier 1014, an adder 40, an input terminal 35 for the reference signal α of the rotation speed of the driving unit 31, an input terminal 355 of the track changeover pulse changed over between "H" and "L" every time the track 34 is scanned by the light ray of FIG. 9, a light ray La emitted from the laser oscillator 1001, a light ray Lb obtained by splitting the light ray reflected at the surface of the recording medium 1 using the half mirror 1004, and light rays Lc and Ld applied to the photodetectors 1007 and 1010 are illustrated.

FIGS. 11(A), 11(B), 11(C) and 11(D) show polarization planes of the light rays La, Lb, Lc and Ld, respectively. Numeral 1030 denotes linear polarization of the light ray La. Numerals 1031 and 1032 denote linear polarization included in the light ray Lb reflected by the magnetic medium 1.

Figure 12:
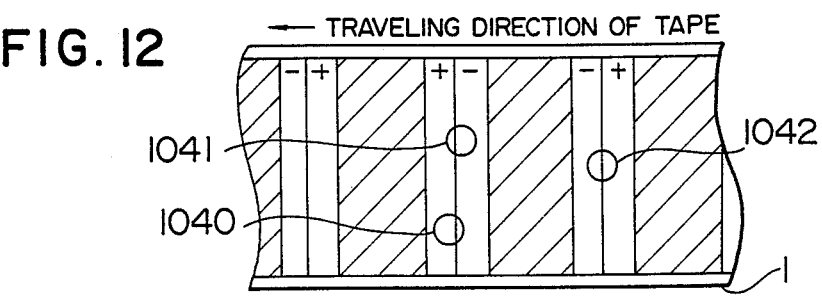
FIG. 12 is a pattern diagram showing the magnetization pattern on the recording medium.

In FIG. 12, numerals 1040, 1041 and 1042 denote spots of light rays formed on the recording medium 1. The shaded region is a signal region recorded between (+) regions or between (−) regions formed by direct current magnetic fields alternately applied when the signal is erased. Therefore, this shaded region constitutes one track in conjunction with (+) regions or (−) regions located on both sides of the shaded region.

The operation of the tracking control in the optical magnetic recording and reproducing apparatus according to the present invention will now be described by referring to FIGS. 10, 11 and 12. Since the speed control of the recording medium 1 during reproduction was described with reference to the embodiment of FIG. 1, it will not be described here.

The light ray La having the linear polarization 1030 as shown in FIG. 11(A) is emitted from the laser oscillator 3 and applied to the boundary between the (+) region and the (−) region via the half mirror 1004, the rotating mirror 5 and the lens 4. As a result, the spot 1040 biased to the (+) region as shown in FIG. 12 is formed on the recording medium 1. The reflected light of the spot 1040 is transmitted again to the half mirror 1004 through the lens 4 and the rotating mirror 5. The reflected light is then split by the half mirror 1004 to form the light ray Lb. The light ray Lb contains the reflected light from the (+) region and that from the (−) region. However, the major part of the light ray Lb is the reflected light from the (+) region. On the other hand, the linear polarization of the light ray La reflected at the (+) region or the (−) region of the recording medium 1 is rotated by $\theta$ clockwise or counterclockwise as shown in FIG. 11(B) as a result of the Kerr effect. Assuming that the reflected light from the (+) region has linear polarization 1031 and the reflected light from the (−) region has linear polarization 1032, therefore, the light ray Lb comprises a large amount of linear polarization 1031. After the light ray Lb has been split into two beams by the half mirror 1005, the light ray Lb is divided into the light rays Lc and Ld by the analyzer 1006 for passing only the linear polarization 1031 and the analyzer 1009 for passing only the linear polarization 1032. The separated light rays Lc and Ld are converted into voltage values corresponding to the intensity of the incident light by the photodetectors 1007 and 1010, respectively. Since the spot 1040 is biased to the (+) region in this case, the output voltage of the photodetector 1007 is larger than that of the photodetector 1010. The output voltage signals of the photodetectors 1007 and 1010 are supplied to the differential amplifier 1014 via the amplifiers 1008 and 1011 as well as the switches 1012 and 1013, respectively. The tracking error voltage sent out from the differential amplifier 1014 is supplied to the driver 30 via the adder 40. The driver 30 is arranged to drive the driving unit 31 with the number of revolutions corresponding to the error voltage. When the spot formed on the recording medium 1 is biased to the (+) region as represented by the spot 1040 of FIG. 12, the magnetic medium 1 is fed so fast that the (+) region contained in the spot may be equal to the (−) region contained in the spot. If the spot formed on the magnetic medium 1 is biased to the (−) region as represented by the spot 1041 of FIG. 12, the output voltage of the photodetector 1010 becomes larger than that of the photodetector 1007. Since the tracking error voltage sent out from the differential amplifier 1014 has a polarity opposite to that of the above described case, the magnetic medium 1 is fed slowly. Thus tracking is so effected that the (+) region within the spot 1041 may be equal to (−) region in area.

In tracking control described above, the (+) region and the (−) region are alternately replaced in the spot formation region as shown in the spots 1040 and 1042 of FIG. 12. Therefore, the input of the differential amplifier 1014 must be changed over on all such occasions. In this embodiment, the output signals of the amplifiers 1008 and 1011 are supplied to the differential amplifier 1014 by changing over switches 1012 and 1013 under the control of the track changeover pulse supplied from the terminal 355 as the control signal. That is to say, the signal "L" is supplied to the terminal 355 in case of the spots 1040 and 1041, and the signal "H" is supplied to the terminal 355 in case of the spot 1042. As a result, the differential amplifier 1041 always sends out the proper tracking error voltage.

By using the above described tracking control unit, excellent reproduction can be conducted in the optical magnetic reproduction apparatus according to the present invention.

Figure 13:
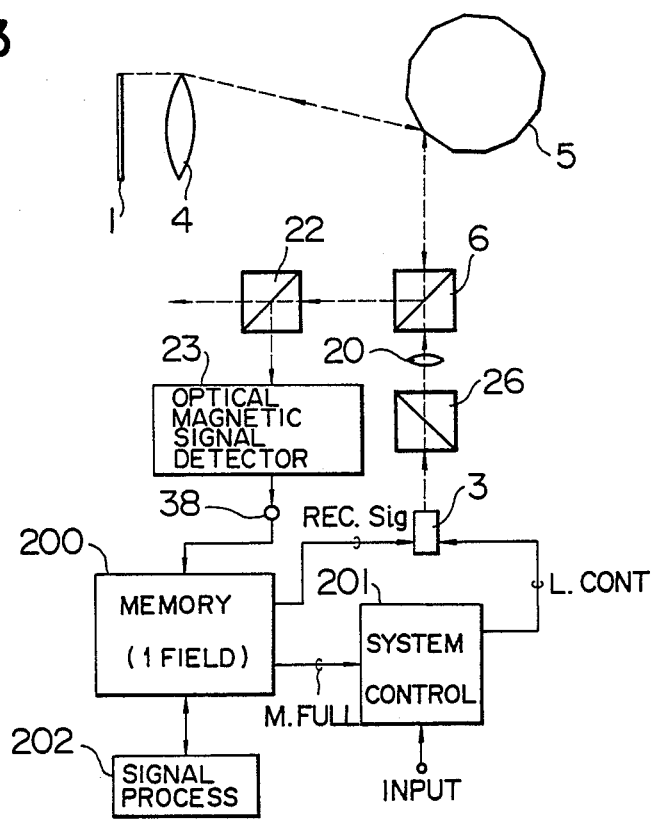
FIG. 13 is a block diagram of an embodiment of the present invention equipped with a memory unit.

FIG. 13 shows another embodiment of the present invention.

In case of still reproduction or fine slow reproduction, the spot of the laser beam is repetitively applied to a particular position on the recording medium. The temperature of the portion of the recording medium rises and exceeds the Curie temperature or the magnetic compensation temperature, resulting in hampered recording. In accordance with a feature of the present invention, as many reproduced signals as need be are detected from the recording medium to be stored in the memory unit, and the radiation of the laser beam is stopped or interrupted until the signals are needed next time. Thus the above described temperature rise is constrained.

When a polygonal rotary scanner is used to scan the recording medium with the laser light as in the optical magnetic recording and reproducing apparatus shown in FIG. 1, irregular reflection of the laser light caused near the vertex of the polygonal rotary scanner may incur a portion having no signals recorded thereon. In accordance with another feature of the present invention, information missing is prevented by means of time base compression using the memory during recording operation, for example.

In FIG. 13, numerals 200, 201 and 202 denote a memory unit, a system control circuit and a signal processing circuit, respectively.

Since the recording and reproduction operation of FIG. 13 is effected in the same way as FIG. 1, it will not be described. Still reproduction and fine slow reproduction will now be described. As many signals as need be are detected from the recording medium 1 and converted into original electric signals in the optical magnetic signal detector 23. The resulting electric signals are written into the memory unit 200. Signals read out from the memory unit 200 are sent to the signal processing circuit to produce desired signals. On the other hand, a write completion signal M. FULL is sent to the system control circuit 201. A laser oscillation control signal L. CONT is sent from the system control circuit 201 to the laser oscillator 3 to stop laser oscillation.

The laser oscillation can be restarted by the laser oscillation control signal L. CONT at the time of frame feed or still reproduction cancellation in case of still reproduction and at the time of tape travel start on the basis of the control signal supplied to the input INPUT in case of fine slow reproduction.

Even for the still reproduction or fine slow reproduction during which the recording medium is still, it can thus be avoided that the laser beam is repetitively radiated onto a particular position on the recording medium for a long time. Since the temperature rise of the recording medium exceeding the Curie temperature or the magnetic compensation temperature is thus prevented, the recorded signal can be protected.

In the above description of the embodiment, oscillation of the laser beam is stopped. However, the present invention is also effective in such configuration that the optical path of the laser beam is interrupted before it reaches the recording medium.

Further, in the above description of the embodiment, the memory unit is disposed at a stage preceding the signal processing circuit. However, the present invention is effective even if the memory unit is disposed at a stage succeeding the signal processing circuit.

Figure 14:
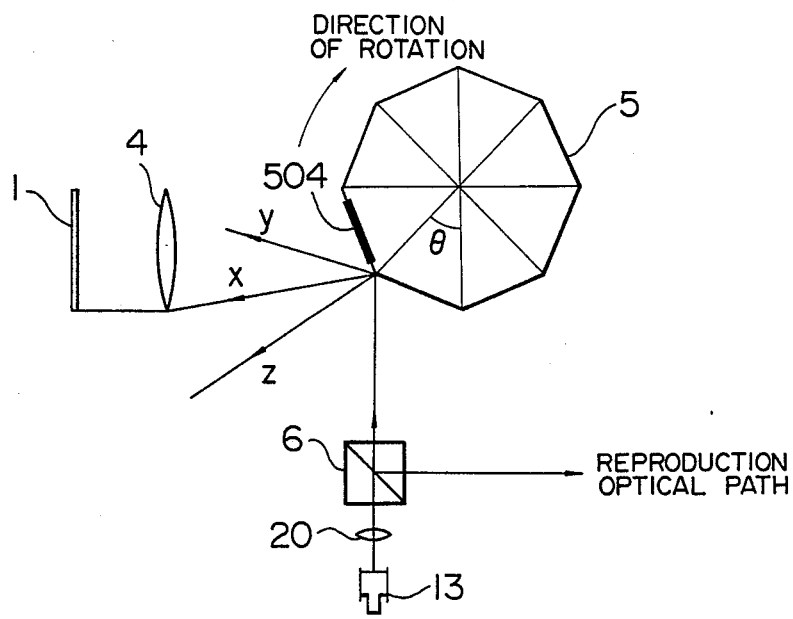
FIG. 14 is a schematic diagram showing the range on the rotary scanner scanned by the time base compression signal.

An embodiment in which the information missing is prevented by effecting time base compression of the information using the memory unit 200 during the recording operation will now be described by referring to FIGS. 14, 15, 16, 17 and 18. In FIG. 14, a recording medium 1, an optical path correction lens 4, a polygonal rotary scanner 5, a beam splitter 6, a focus lens 20, and a laser oscillator 13 are illustrated. If the polygonal rotary scanner 5 is used, the light ray undergoes irregular reflection when it strikes against each vertex. If the light ray enters the optical path correction lens 4 as represented by x, there occurs no problem. In fact, however, the the light ray is scattered in a direction other than the desired direction as represented by y and z. As a result, erroneous information is recorded. As illustrated in FIG. 14, therefore, only a plane section 504 other than the vertex is used to record and reproduce the necessary information. When the polygonal rotary scanner 5 is used, therefore, it is inevitable that the information becomes discontinuous during the recording and reproduction operation. Whether the recorded signal is analog or digital, therefore, it is necessary to place a signalless section near each vertex of the polygonal rotary scanner 5. The memory unit 200 becomes thus indispensable.

When the polygonal rotary scanner 5 is formed as an octagon and a video signal having a field frequency of 60 Hz is to be recorded, for example, it is possible to record the information of one field onto four sides of the polygonal rotary scanner 5 by choosing 120 revolutions per second as the number of rotations of the polygonal rotary scanner 5.

Figure 15:
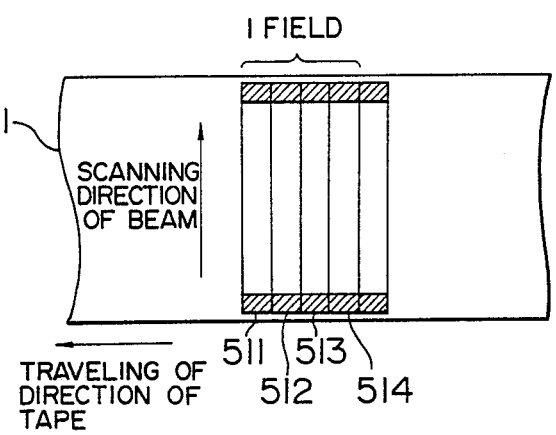
FIG. 15 is a schematic diagram showing the range on the recording medium scanned by the time base compression signal.
Figure 16:
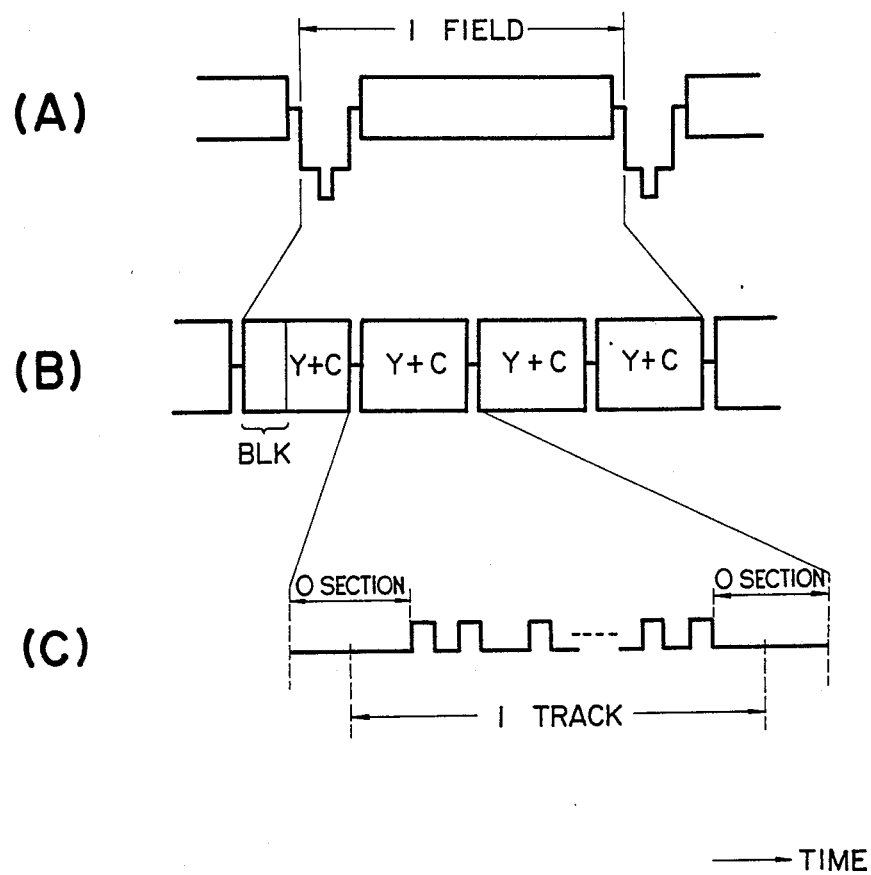
FIG. 16(A), (B) and (C) are timing diagrams when a video signal undergoes time base compression and is recorded on four segments.

FIG. 15 shows the recording pattern on the recording medium 1. By rotating the octagonal rotary scanner 5 at 120 revolutions per second as shown in FIG. 14, one field can be formed by four tracks 511, 512, 513 and 514. This recording scheme is hereafter referred to as "four segment recording". In order to make the vicinity of the vertex of the polygonal rotary scanner 5 a signalless section in the four segment recording scheme as described before, nothing is recorded on the shaded region of the recording medium 1. The signal recorded on the tracks 511, 512, 513 and 514 is a video signal which has undergone time base compression as shown in FIG. 16, for example. The time base compression technique using the memory unit is known and hence will not be described in detail. That is to say, one field section of a video signal as shown in FIG. 16(A) undergoes time base compresson and is divided into four blocks as shown in FIG. 16(B). A vertical blanking period BLK is also shown in FIG. 16(B). Between the successive blocks of the four blocks, a signalless section lasts for a certain period. In FIG. 16(C), the recorded information is a digital signal, and signalless sections and one block are illustrated. The portion ranging from the center of one signalless section (0 section) to the center of another signalless section (0 section) corresponds to one track of FIG. 15. In the optical modulation system, for example, the strength of the light of the laser beam is converted into the amount of heat on the optical magnetic tape to be recorded. When digital signals "0" and "1" are used, "0" corresponds to weak light and "1" corresponds to strong light. By placing the 0 signal section between blocks as shown in FIG. 16, therefore, the weak laser beam strikes against the polygonal rotary scanner 5 of FIG. 14 near the vertex thereof. As a result, erroneous information is not recorded on the recording medium because of irregular reflection. Although skew compensation and jitter compensation are needed during reproduction because of four segment recording, the compensation can be sufficiently conducted in the signalless section (0 section) between blocks.

When the segment recording is effected, the number of rotations n of the polygonal rotary scanner 5 is related to the number of angles N as $$n = N' \times \frac{f}{2} = \frac{N}{2} \times \frac{f}{2} \quad (1)$$

where f is the field frequency and $N' = N/2$ is the number of segments.

Reproduction of the segment recording will not be described. However, it is a matter of course that processing similar to that of the segment recording in the conventional magnetic recording and reproducing apparatus is effected during reproduction.

Figure 17:
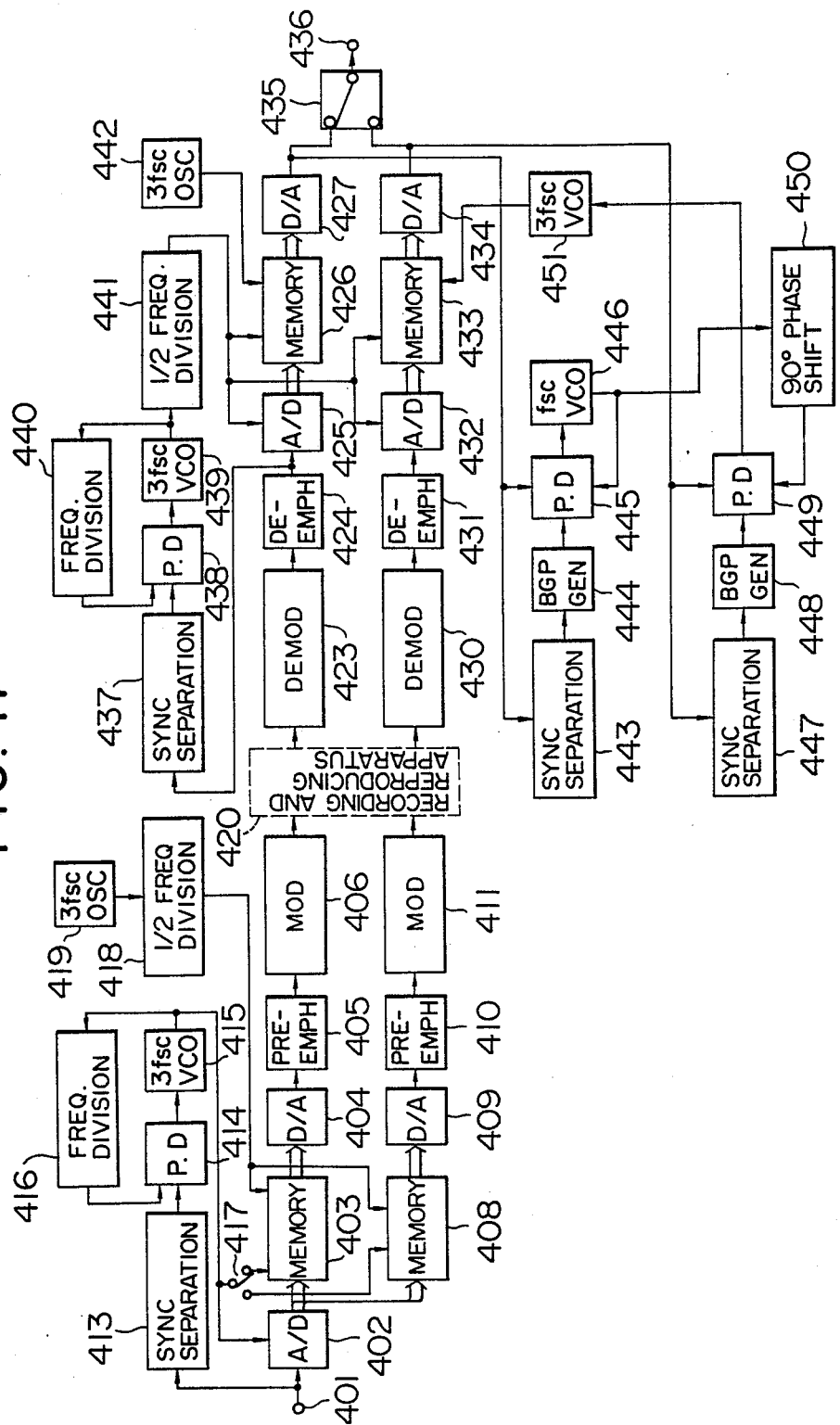
FIG. 17 is a block diagram implementing the time base compression and expansion signal processing method.

FIG. 17 shows another embodiment of the signal processing system using the memory unit. In FIG. 17, an input signal 401 of a color video signal, an A/D converter 402, memories 403 and 408 for storing the information nearly over the 1H period, D/A converters 404 and 409, preemphasis circuits 405 and 410, modulation circuits 406 and 411 for modulating the signal into the FM signal, for example, a synchronization separation circuit 413, a phase detection circuit 414, a voltage controlled oscillation circuit (hereafter referred to as VCO) 415 having a frequency of 3fsc (where fsc is color subcarrier frequency), a frequency division circuit 416, a switch circuit 417 changed over at an interval of 1H (where 1H is the horizontal scanning period), a ½ frequency division circuit 418, an oscillation circuit 419 of 3fsc, a recording and reproducing unit 420 represented by FIG. 1, demodulation circuits 423 and 430, deemphasis circuits 424 and 431, A/D converters 425 and 432, memories 426 and 433, D/A converters 427 and 434, a switch circuit 435 changed over at an interval of 1H, an output terminal 436 of the reproduced signal, synchronization separation circuits 437, 443 and 447, phase detection circuits 438, 445 and 449, VCO's 439 and 451 of 3fsc, a frequency division circuit 440, a ½ frequency division circuit 441, an oscillation circuit 442 of 3fsc, burst gate pulse generation circuits 444 and 448, a VCO 446 of fsc, and a 90° phase shift circuit 450 are included in FIG. 17.

Figure 18:
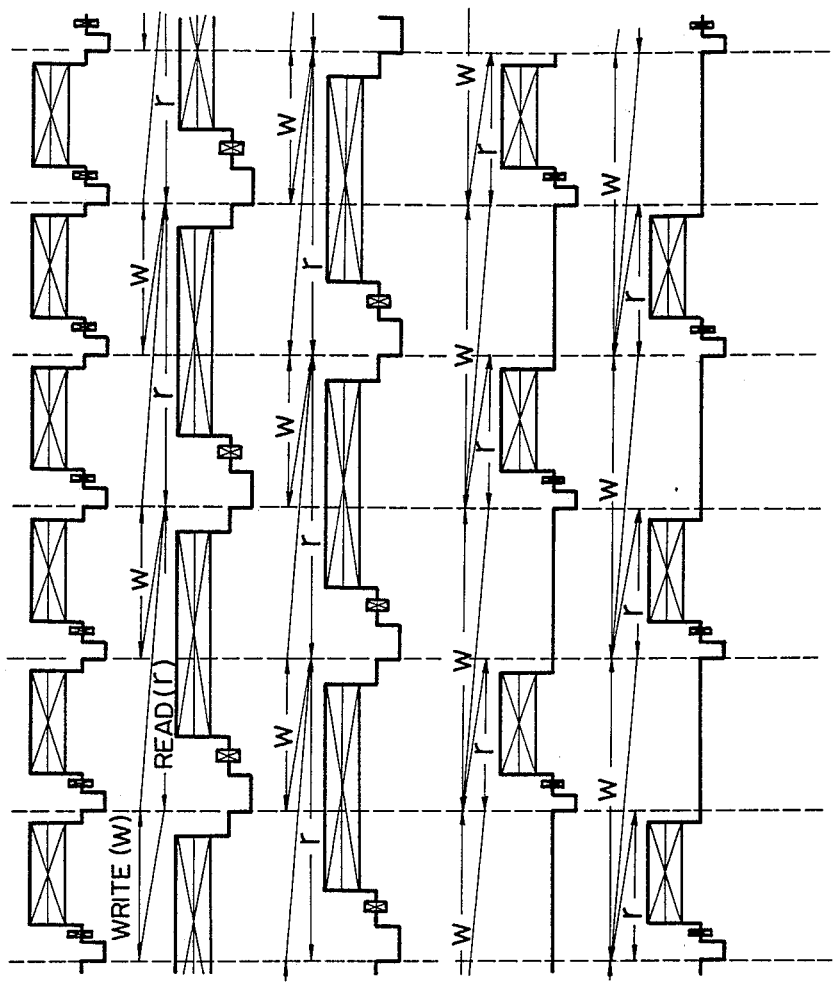
FIG. 18(A-E) are waveform diagram showing the waveform and timing of signal processing of FIG. 17.

The operation of this circuit will now be described by referring to FIG. 17 and FIG. 18 showing the waveform and timing of FIG. 17.

A color video signal as shown in FIG. 18(A) is supplied to the input terminal 401 and led to the A/D converter 402. The A/D conversion is carried out with the sampling frequency 3fsc and the number of output bits 8, for example. In order to produce the sampling frequency 3fsc, the synchronization separation circuit 413, the phase detection circuit 414, the VCO 415 of 3fsc, and the frequency division circuit 416 constitute a PLL. The color video signal converted into the digital signal by the A/D converter 402 is supplied to the memories 403 and 408 and stored in those memories at the timing of "Write (w)" shown in FIG. 18(B) and (C). The information stored in the memories 403 and 408 is read out with clocks derived by supplying the output of the 3fsc oscillator 419 to the ½ frequency division circuit 418. This readout timing is the period of "Read (r)" shown in FIG. 18(B) and (C). The information thus read out is supplied to the D/A converters 404 and 409 to be converted into analog signals. Since the readout clock is (3/2)fsc, the analog signal is expanded twice in time base. Accordingly, the band of the signal is also reduced to half as compared with the original band. A margin is thus left with respect to the recording wavelength of the recording medium, resulting in higher picture quality. Outputs of the D/A converters 404 and 409 are emphasized in high frequency by the emphasis circuits 405 and 410, and FM-modulated, for example, by the modulation circuits to be recorded in the recording and reproducing unit apparatus 420.

The reproduction process will now be described. Reproduced outputs from the recording and reproducing apparatus are demodulated by the demodulation circuits 423 and 430 and undergo noise suppression in the deemphasis circuits 424 and 430. Thus the reproduced signals expanded twice in the time base as shown in FIG. 18(B) and (C) are obtained. These signals are led to the A/D converters 425 and 432, and sampled at the sampling frequency of (3/2)fsc, for example, to be stored in the memories 426 and 433. In order to produce (3/2)fsc, the synchronization separation circuit 437, the phase detection circuit 438, the 3fsc VCO 439, and the ½ frequency division circuit 440 constitute a PLL. The output of the VCO 439 is supplied to the ½ frequency division circuit 441. Clocks of (3/2)fsc are obtained as the output of the ½ frequency division circuit 441. Signals are stored into the memories 426 and 433 during periods "w" shown in FIG. 18(D) and (E). Signals stored in the memory 426 are read out at clocks supplied from the 3fsc oscillation circuit 442. Information read out from the memory 426 is led to the D/A converter 427, which sends out signals having the original time base as shown in FIG. 18(D) at an interval of 1H. The memory 433 and the D/A converter 434 also function nearly in the same way as the memory 426 and the D/A converter 427 to send out signals as shown in FIG. 18(E) having signal duration periods opposite to those of FIG. 18(D) at an interval of 1H.

The information must be read out from the memory 433 so that the output of the memory 433 may match strictly with that of the memory 426 in time. That is to say, the readout clock timing for the memory 433 is so controlled that the color burst signals sent out from both memories may match in phase. Otherwise, the color signal modulated by the subcarrier is affected by color phase irregularity, for example. The synchronization signal is separated from the signal of FIG. 18(D) supplied from the D/A converter 427. And the burst gate pulse is produced by the burst gate pulse generation circuit 444. Upon application of the burst gate pulse, the burst signal contained in the output of the D/A converter 427 and the output of the fsc VCO 446 are phase-detected in the phase detection circuit 445 to control the fsc VCO 446. Thus the PLL is constituted. As a result, the phase of the output of the fsc VCO 446 is phase-locked to the burst signal contained in the output signal of the D/A converter 427 with a phase difference 90°. The output of the fsc VCO 446 is shifted in phase by the 90° phase shift circuit 450 and compared in phase with the burst signal contained in the output signal from the D/A converter 434 by the phase detection circuit 449. The output of the phase detector circuit 449 is used to control the 3fsc VCO 451 to vary the readout timing for the memory 433. The burst gate pulse is produced from the synchronization signal contained in the output of the D/A converter 434 by the synchronization separation circuit 447 and the burst gate pulse generation circuit 448. The resultant burst gate pulse is supplied to the phase detection circuit 449.

By the above described configuration, the outputs of the D/A converters 427 and 434 as shown in FIG. 18(D) and (E) have proper phase relationship. These outputs are supplied to the switch circuit 435 changed over at an interval of 1H to send out the original color video signal from the output terminal 436.

By using the above described recording and reproducing process, the reproduced signal is obtained without passing through the Y/C separation process even a single time. The information carried by the standard color signal is not lost at all, and the picture quality is not deteriorated.

In the above description of the example, two channels were used for recording and reproduction operation. However, it is easily conceivable to use n channels in the same way for recording and reproduction operation. Assuming that three channels are used, the signal is expanded three times in time base to be recorded as three parallel signals and is reproduced by the inverted process.

Further, the information missing due to the unrecorded period caused when the track of the optical scanning is changed over can be prevented by making the unrecorded period the vertical synchronization period and adding the vertical synchronization signal during the reproduction operation.

Figure 19:
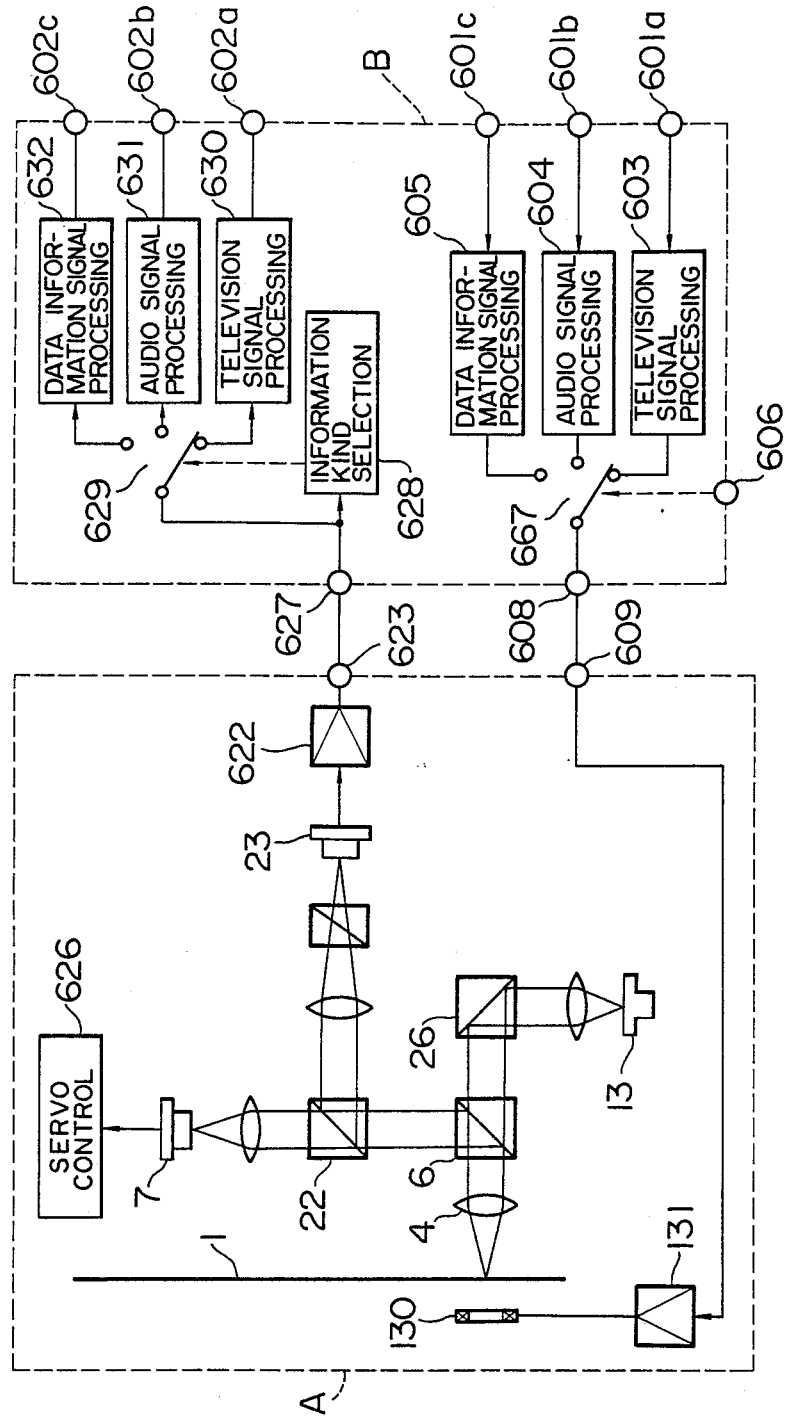
FIG. 19 is a block diagram showing an embodiment of an optical magnetic recording and reproducing system.

FIG. 19 shows an embodiment of the optical magnetic recording and reproducing system according to the present invention. FIG. 19 is characterized in that the optical magnetic recording and reproducing apparatus is composed of a main body A based upon FIG. 1 and a signal processing portion B comprising an encoder for converting various input signals into recording signals and a decoder for restoring the reproduced signals to the original information signals.

The recording and reproducing apparatus heretofore records and reproduces only one kind of information signal. Therefore, the main body A and the signal processing portion B were formed as a single body. And the signal was supplied from an input terminal 601 of information signal and recorded onto the recording medium 1 through the recording signal processing circuit. And the signal reproduced from the recording medium 1 was sent out from an output terminal 602 through the reproduced signal processing circuit. However, the optical magnetic recording and reproducing apparatus is larger than the conventional recording and reproducing apparatus by at least one order in recording density. Unlike the conventional apparatus, therefore, it is important from the view-point of the cost performance that not only one kind of information signal but also many kinds of information signals can be recorded on one recording medium.

The signal supplied to the input terminal 601 of the signal processing portion B are converted to recording signals in respective recording signal processing circuits 603 to 605 and led to a changeover circuit 607. On the basis of a control signal supplied from an information selection terminal 606, the recording signal of arbitrary information is supplied as the output of the changeover circuit 607 to be sent out from the output terminal 608. The recording signal sent out from the signal processing portion B is supplied to an input terminal of the main body A to undergo the recording and reproducing processing described before by referring to FIG. 1. The magnetic modulation system is shown in FIG. 19. However, the present embodiment is not limited to the magnetic modulation system. It is a matter of course that the optical modulation system may also be used.

During reproduction, the reproduced signal reproduced in the main body A is sent out from an output terminal 623 and led to an information kind selection circuit 628 and a changeover circuit 629 through an input terminal 627 of the signal processing portion B. The information kind selection circuit 628 determines which kind of information is the reproduced signal and switches the changeover circuit 629. The signal of the information selected by the changeover circuit 629 is restored by reproduced signal processing circuits 630 to 632 to be sent out from output terminals 602.

Figure 20A:
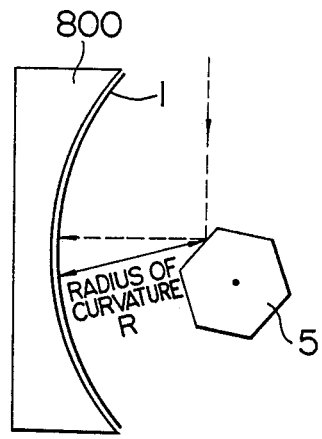
FIGS. 20A and 20B are schematic diagrams showing an embodiment of the portion for making a recording medium travel according to the present invention.

FIG. 20 shows an embodiment of the portion for making the recording medium travel according to the present invention. In FIG. 20A, a guide 800 for making the recording medium travel, a recording medium 1, and a polygonal rotary scanner 5 for making the laser light scan are illustrated. In accordance with one feature of the present invention, the guide 800 for making the recording medium travel is concave and is supplied with such a radius of curvature R that the transmission distance of the laser light emitted from the polygonal rotary scanner 5 to the recording medium will be constant. Thereby the optical path of the laser light from the polygonal rotary scanner 5 to the recording medium 1 can be made constant. Thus the simplification of mechanical system and control system including the elimination of the optical path correction lens 4 is attained, resulting in a lower cost.

Figure 20B:
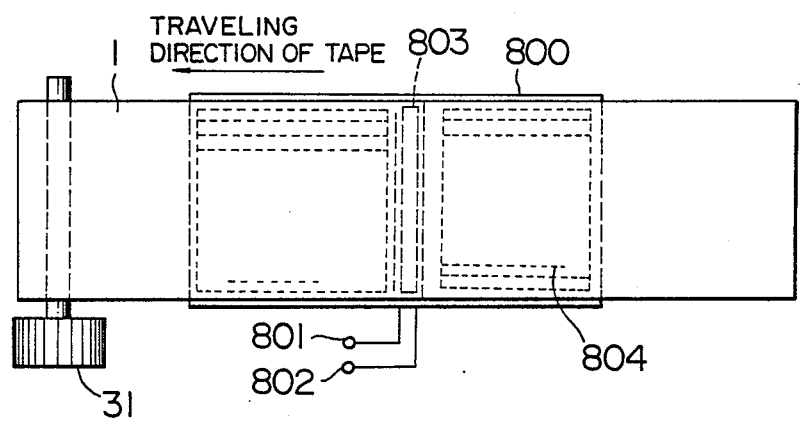

FIG. 20B is a front view of the guide 800 for making the recording medium travel. In FIG. 20B, the recording medium 1 is driven by the driving unit 31 to travel along the concave guide for making the recording medium travel. The guide 800 sucks air through a number of mesh holes 804 so that the recording medium may travel along the concave guide without being in contact with it. An optical magnetic recording coil 803 is included in the guide 800. From terminals 801 and 802, a signal current is supplied to the optical magnetic recording coil 803 so that the magnetic field modulated by the recording signal may be generated over the scanning range of the optical magnetic recording laser light on the recording medium. Otherwise, the laser light modulated by the recording signal is radiated onto the recording medium. Thus the magnetization direction based upon the signal current is left on the recording medium.

FIG. 21 shows another embodiment of the portion for making the recording medium travel according to the present invention. In FIG. 21, convex and concave pinch rollers 850 to 853 for curving the recording medium in the recording medium width direction, a recording medium curving guide 854 containing an electromagnetic coil therein, an iris lens 855, and a recording electric signal input terminal 856 are illustrated in FIG. 21.

In accordance with a feature of the present invention, the recording medium is curved in the width direction so that the distance from the polygonal rotary scanner to the recording medium may be constant and the laser light may be applied to the recording medium at a right angle.

Accordingly, simplification of the mechanical system and the control system including the elimination of the optical path correction lens 4 is attained, resulting in a lower cost.

In FIG. 21, the recording medium 1 is fed by the pinch rollers 850 to 853 to travel along the curving guide 854 containing the electromagnetic coil.

The mechanism of the pinch rollers 850 to 853 for curving the recording medium in the width direction will now be described. The pinch rollers 850 and 852 constitute a convex-concave pair and the pinch rollers 851 and 853 also constitute a convex-concave pair. The recording medium 1 is put between respective pairs to be curved in the width direction of the recording medium.

Figure 22:
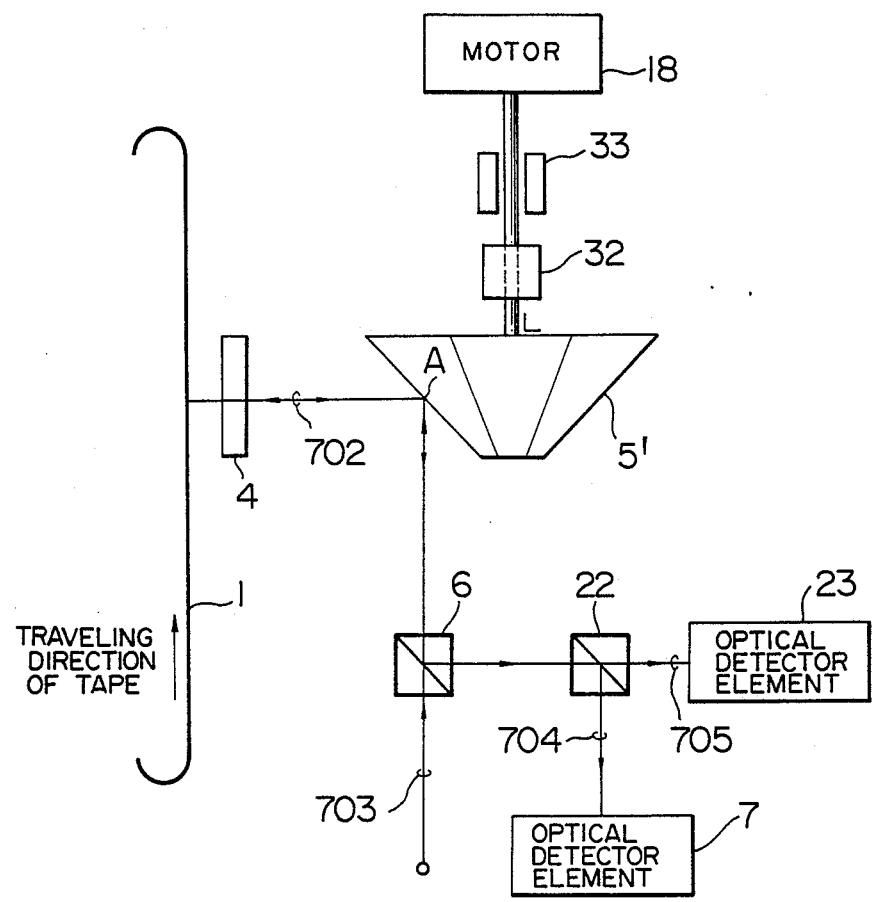
FIG. 22 is a block diagram showing an embodiment using a rotary scanner having a structure of a polygonal truncated pyramid.

FIG. 22 shows an embodiment of the optical magnetic recording and reproducing apparatus using a polygonal rotary scanner 5 having a structure of a polygonal truncated pyramid. Components of FIG. 22 denoted by reference numerals identical with those of FIG. 1 have functions identical with or like those of FIG. 1. And the recording and reproducing process is also similar to that of FIG. 1 and hence will not be described in detail.

FIG. 22 is characterized in that a rotary scanner 5' having a polygonal truncated pyramid structure is used instead of the polygonal rotary scanner 5. Thereby, the recording medium 1, the lens 4, the polygonal truncated pyramid rotary scanner 5', the beam splitters 6 and 22, and so on can be placed in the same plane (on the same substrate), resulting in a thin set.

Figure 23:
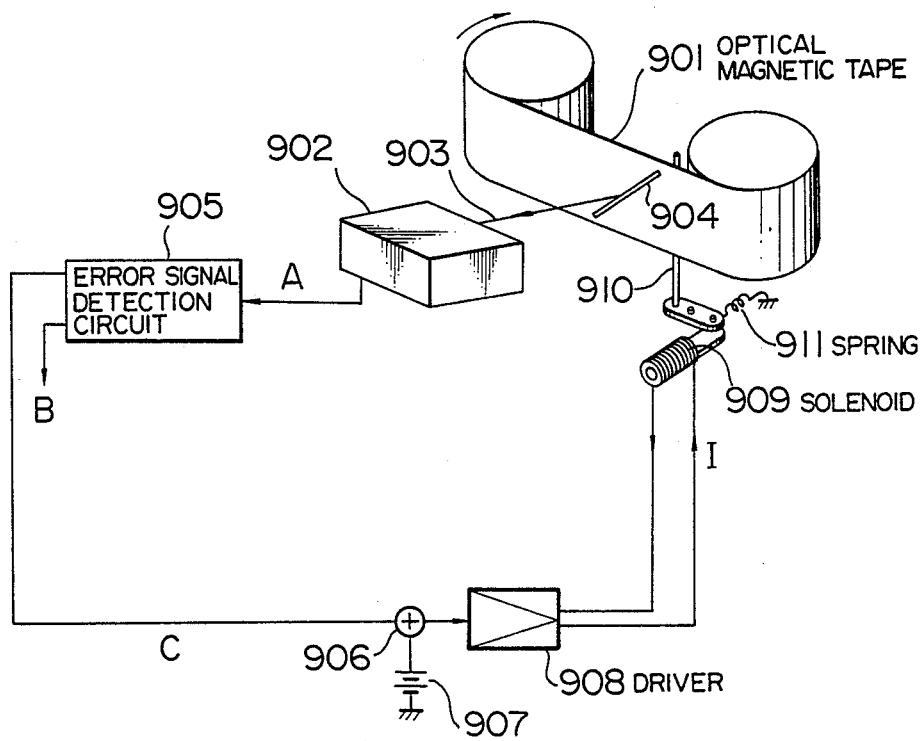
FIG. 23 is a block diagram showing another embodiment of focus servomechanism.

FIG. 23 shows an embodiment concerning the configuration of the focus servo system. This embodiment will now be described by referring to FIG. 23.

This embodiment is a focus servo system utilizing the fact that the flexible recording medium such as optical magnetic tape 901 is used for recording.

In accordance with a feature of the present embodiment, the focus servocontrol in the optical axis direction is effected by changing the position of the portion for holding the optical magnetic tape.

An optical beam 903 read out from a recording pattern 904 of FIG. 23 is supplied to an optical system 902 including a polygonal rotary scanner and a laser oscillator and is converted to an electrical signal A. The electrical signal A is supplied to an error signal detection circuit 905 to be separated into a tracking error signal B corresponding to the tracking shift and a focus error signal C corresponding to the focus shift. How to produce the error signals B and C is widely known in the art of the optical disk and hence will not be described. Tracking servocontrol is effected by displacing the polygonal rotary scanner, the laser oscillator and so on using the tracking error signal B as described before.

The focus error signal C is supplied to a driver 908 together with a bias source 907 via an adder 906 to control a driving current I flowing through a solenoid 909. A guide pin 910 for changing the position of the holding face of tape 901 is linked to the solenoid 909. On the other hand, the solenoid 909 is pulled by a spring 911. The voltage of the bias power supply 907 is so defined that the guide pin 910 may be held at a predetermined position when the focus error signal C is zero. In the above described example, the solenoid and the tension pin are used for changing the position of the tape holding face. As a matter of fact, however, other methods such as use of a piezoelectric element may be used. By using the above described configuration, the position of the tape face is automatically adjusted so that the focus error signal C may become zero. As a result, the focus servocontrol can be realized without moving the component of the optical system.

In the above described example, the focus servocontrol is effected only by controlling the position of the tape face. In case of the optical magnetic tape recording, however, the focus correction value is large as compared with the optical magnetic disk. Therefore, it is also possible to employ such configuration that the focus servocontrol for a large displacement component is effected by the position control of the tape face and the focus servocontrol for a residual slight displacement component is effected by moving the above described component of the optical system. This configuration facilitates focusing without making the magnetic tape take the shape of a circular arc.

Figure 24:
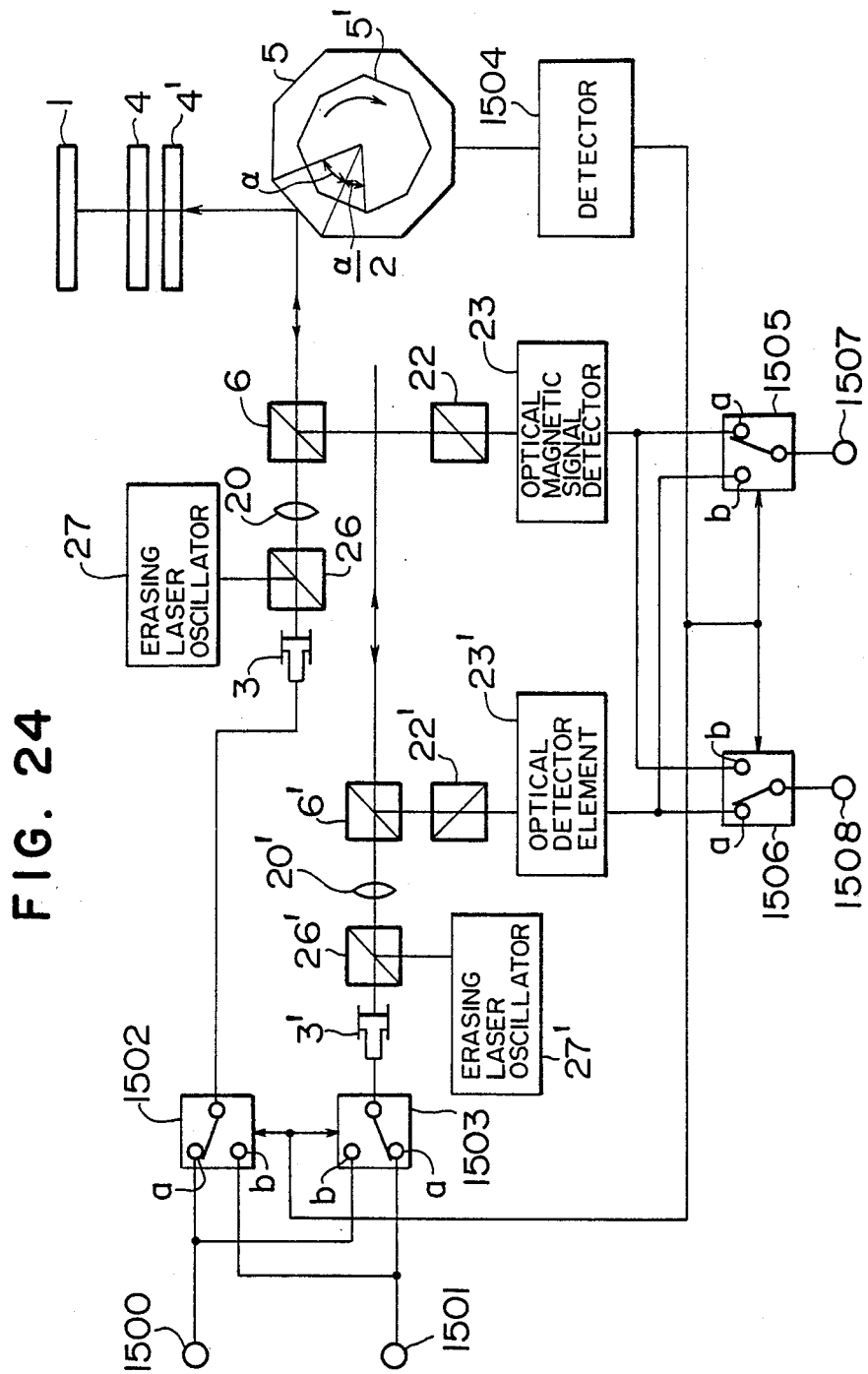
FIG. 24 is a block diagram showing an embodiment in which two kinds of signals are simultaneously recorded.

FIG. 24 shows another embodiment of the present invention in which a plurality of signals are simultaneously recorded. This embodiment will now be described by referring to FIGS. 25 and 26.

In FIG. 24, components identical with those of FIG. 1 are denoted by the same reference numerals. Although portions which are not necessary for describing the present embodiment are not shown, the control system is the same as that of embodiment shown in FIG. 1.

During the recording operation, a coupling point a of a switch circuit 1502 is supplied with the first signal entering from an input terminal 1500, and a coupling point b of the switch circuit 1502 is supplied with the second signal entering from an input terminal 1501. The signal selected by the switch circuit 1502 is radiated onto the recording medium 1 via the polygonal rotary scanner 5 to be recorded as described before. A coupling point b of a switch circuit 1503 is supplied with the first signal entering from the input terminal 1500, and a coupling point a of the switch circuit 1503 is supplied with the second signal entering from the input terminal 1501. The signal selected by the switch circuit 1503 is radiated onto the recording medium 1 via the polygonal rotary scanner 5' to be recorded as described before.

The polygonal rotary scanner 5' is disposed at an angle of $\alpha/2$ with respect to the center angle $\alpha$ of one side of mirror of the polygonal rotary scanner 5. The number of revolutions of the polygonal rotary scanner 5 is detected by a detector 1504 to control the switch circuits 1502, 1503, 1505 and 1506. For clear understanding of the drawing, the scanner 5' is made smaller than the scanner 5 in FIG. 24. In fact, however, it is desirable that the scanner 5' is equal to the scanner 5 in size.

Figure 26:
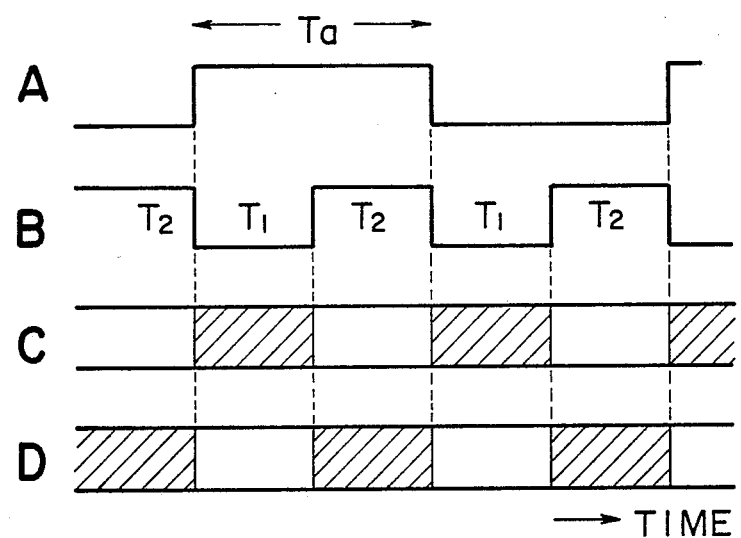
FIG. 26(A-D) are timing diagrams of changeover switches shown in FIG. 24.

FIG. 26 shows timing for changing over the mirror side of the polygonal rotary scanner 5, the output signal of the detector 1504 for controlling the switch circuits 1502, 1503, 1505 and 1506, and signals recorded by the polygonal rotary scanners 5 and 5'. FIG. 26A shows the timing whereby the mirror side of the polygonal rotary scanner 5 is changed over. FIG. 26B shows the output signal of the detector 1504. FIG. 26C and D show signals recorded by the polygonal rotary scanner 5 and 5'. During a period represented by a blank, the first signal is recorded. During a shaded period, the second signal is recorded. During a period $T_1$, the output signal B of the detector 1504 is "Low". During this period $T_1$, the switch circuits 1502, 1503, 1505 and 1506 are connected to respective coupling points b. During the period $T_1$, the second signal represented by a shaded region entering from the input terminal 1501 is recorded by the polygonal rotary scanner 5, and at the same time the first signal represented by a blank region entering from the input terminal 1500 is recorded by the polygonal rotary scanner 5'. During a period $T_2$, the output signal B of the detector 1504 is "High". During this period $T_2$, the switch circuits 1502, 1503, 1505 and 1506 are connected to respective coupling points a. During the period $T_2$, the first signal represented by a blank region entering from the input terminal 1500 is recorded by the polygonal rotary scanner 5, and the second signal represented by a shaded region entering from the input terminal 1501 is recorded by the polygonal rotary scanner 5'.

Figure 25:
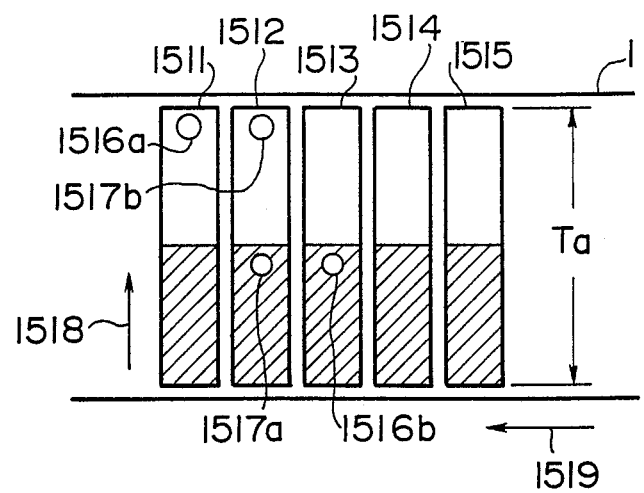
FIG. 25 is a pattern diagram showing the track pattern of FIG. 24.

FIG. 25 shows a formed track pattern. In FIG. 25, a recording medium 1, tracks 1511 to 1515, laser beam spots 1516a and 1516b formed by the polygonal rotary scanner 5, laser beam spots 1517a and 1517b formed by the polygonal rotary scanner 5', traveling direction 1518 of the laser beam spot, and traveling direction 1519 of the recording medium are illustrated.

The feed speed of the recording medium and the rotation speed of the polygonal rotary scanner are so defined that the tracks scanned by the reflected beam supplied from the polygonal rotary scanner 5 may be the tracks 1511, 1513 and 1515, while the tracks scanned by the reflected beam supplied from the polygonal rotary scanner 5' may be the tracks 1512 and 1514 disposed between the above described tracks and the scanning period of one track may become $T_a$.

If the laser beam spot of the polygonal rotary scanner 5 scans from the lower part of the track 1511 to 1516a during the period $T_a$, the signal is switched from the second signal represented by a shaded region to the first signal represented by a blank region when a period of $T_a/2$ has elapsed as shown in FIG. 26C. Accordingly, the second signal is recorded onto the lower half of the track 1511, and the first signal is recorded onto the upper half of the track 1511. At the same time, the laser beam spot of the polygonal rotary scanner 5' scans the track 1512. Since the mirror side of the scanner 5' is different by $\alpha/2$ from that of the scanner 5, the scanning of the scanner 5' is $T_a/2$ behind that of the scanner 5. When the laser beam supplied from the polygonal rotary scanner 5 is present at 1516a on the track 1511, therefore, the laser beam of the polygonal rotary scanner 5' scans from the lower part of the track 1512 and exists on the position of 1517a.

After the laser beam of the polygonal rotary scanner 5 has scanned the track 1511, it scans the track 1513. After the elapse of $T_a/2$, the beam spot moves from 1516a to 1516b. At the same time, the laser beam of the polygonal rotary scanner 5' moves from 1517a of the track 1512 to 1517b. Since this period is within the period of $T_a/2$ after the mirror side of the polygonal rotary scanner 5 has been changed over, it is the period $T_1$ shown in FIG. 26. That is to say, the second signal represented by a shaded region is recorded onto the lower half of the track 1513 scanned by the polygonal rotary scanner 5, and the first signal represented by a blank region is recorded onto the upper half of the track 1512 scanned by the polygonal rotary scanner 5'. In the tracks formed by the polygonal rotary scanners 5 and 5' during scanning, therefore, it is possible to record the first signal onto portions represented by blank regions and record the second signal onto portions represented by shaded regions as shown in FIG. 25.

During the reproduction operation, the readout laser beams supplied from the laser 3 and 3' are reflected by the recording medium 1 to be sent to optical magnetic signal detectors 23 and 23'. The signal demodulated by the optical magnetic signal detector 23 is supplied to the coupling point a of the switch circuit 1505 and the coupling point b of the switch circuit 1506. On the other hand, the signal demodulated by the optical magnetic signal detector 23' is supplied to the coupling point b of the switch circuit 1505 and the coupling point a of the switch circuit 1506. Although the first signal and the second signal are alternately sent out as the signals demodulated by the optical magnetic signal detectors 23 and 23', the first signal can be continuously obtained at an output terminal 1507 by using the switch circuit 1505 and the second signal can be continuously obtained at an output terminal 1508 by using the switch circuit 1506.

By using the present invention, therefore, it is possible to record two kinds of signals simultaneously and record respective signals on continuous tracks. As a result, noiseless signals of good quality can be reproduced during the variable speed reproduction.

Figure 27:
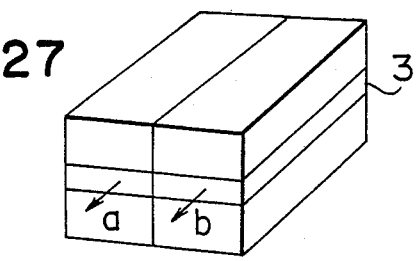
FIG. 27 is an oblique view showing a light source of another embodiment in which two kinds of signals are recorded.
Figure 28:
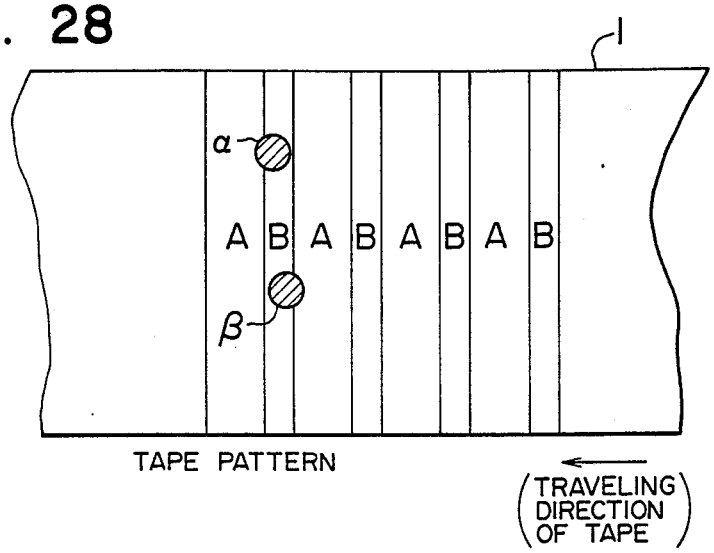
FIG. 28 is a track pattern diagram of FIG. 27.
Figure 29:
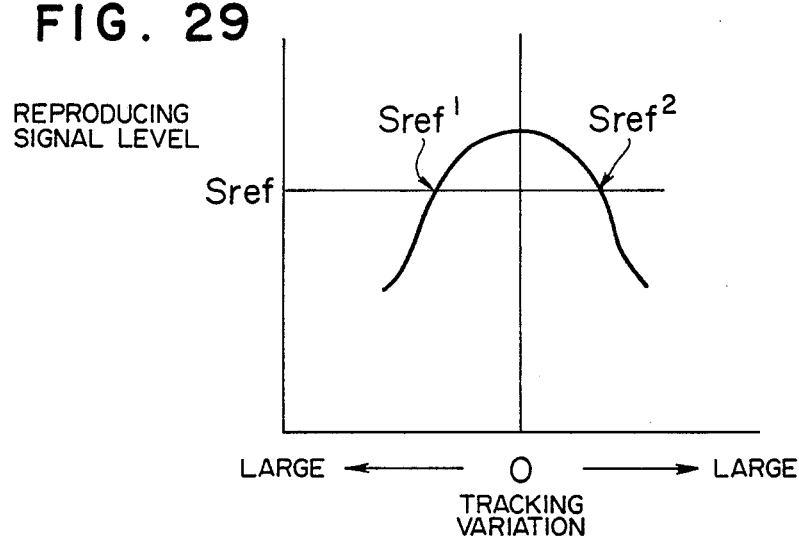
FIG. 29 is a characteristic diagram showing the relationship between the tracking variation value and the reproduced signal level.

In an example of the present invention shown in FIGS. 27 to 29, two synchronized signals such as the video signal and the audio signal are recorded and at the same time one of the signals is used for tracking.

As shown in FIG. 27, the laser oscillator 3 is composed of two oscillators which are adjacent each other. The video signal is recorded using a light source a, and the audio signal is recorded using a light source b. FIG. 28 shows the track pattern at this time. In FIG. 28, a recorded pattern A of the video signal and a recorded pattern B of the audio signal are illustrated. The audio signal on the pattern B is used as the tracking signal as well. At this time, the reproduced signal level is lowered as the tracking error becomes large as shown in FIG. 29. Accordingly, a reference level Sref is established, and tracking control is effected depending upon whether the reproduced signal level is higher than the reference level or not. At this time, two reference signal levels $Sref_1$ and $Sref_2$ are produced as shown in FIG. 29. If the traveling speed of the recording medium is configured to be made faster when the reproduced signal level becomes lower than Sref, tracking control is effected at a position slightly displaced from "Just Track" into the traveling direction of the recording medium as represented by $\alpha$ of FIG. 28. If the traveling speed of the recording medium is configured to be delayed when the reproduced signal level becomes lower than Sref, tracking control is effected at a position slightly displaced from "Just Track" in the direction opposite to the traveling direction of the recording medium as represented by $\beta$.

In accordance with the present invention, tracking control does not cause "Just Track" positioning. However, tracking control close to the "Just Track" control becomes possible by establishing a sufficiently high value as Sref, resulting in no problem.

As the control method for the rotation speed or the rotation phase of the motor in the servo system of a conventional magnetic recording and reproducing apparatus, the motor is so controlled as to be the desired rotation speed by the feedback on the basis of the detected signal relating to the rotation speed of the motor. For a change in the characteristic of the control system such as a large change in the environment (temperature or humidity), a change in the controlled object (motor) with time, and nonuniformity in mass production of products, however, offset is produced in the rotation speed or phase and the response of the control system is changed when only the conventional feed back control system is used.

Figure 30:
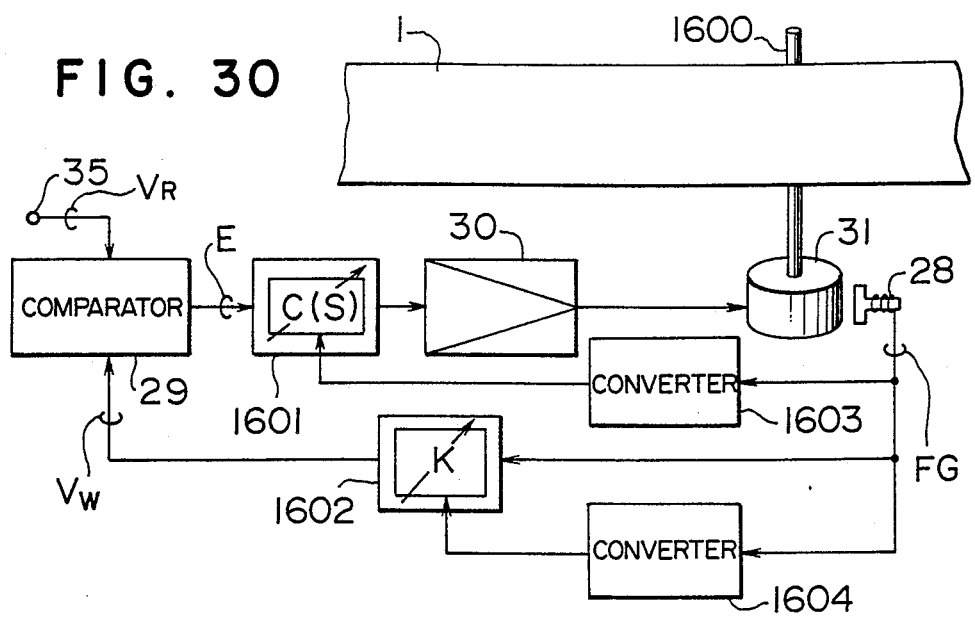
FIG. 30 is a block diagram showing another embodiment of servocontrol according to the present invention.

FIG. 30 shows an embodiment of capstan control system of an optical magnetic recording and reproducing apparatus according to the present invention in which control operation is effected while the optimum parameter of the control unit is so automatically corrected that the optimum capstan traveling control may be effected upon the occurrence of the above described change in the characteristics of the control system.

The operation of the embodiment will now be described by referring to FIG. 30. A capstan 1600 makes the recording medium 1 travel on the basis of the rotation of the above described capstan motor 31. A variable parameter control element 1601 is supplied with a speed error signal E from a comparator 29 and has a transfer function C(S). An element 1602 is a feedback gain varying element of the speed feedback system. On the basis of signals supplied from the frequency generator 28 via conversion elements 1603 and 1604, the variable parameter control element 1601 and the feedback gain varying element 1602 are capable of varying the parameter and feedback gain, respectively. When the characteristics of the object to be controlled such as the motor 31 has changed in the capstan control system of the optical magnetic recording and reproducing apparatus configured as described above, the change in the frequency generator is observed to correct the variable feedback gain K within the feedback gain varying element 1602 via the conversion element 1604 and the parameter of the variable control element C(S) within the control element 1601 via the conversion element 1603. Thus the optimum control is immediately effected so that the capstan motor 31 may have a desired rotation speed or rotation phase. As a result, the tape traveling is always controlled to be optimum.

Figure 31:
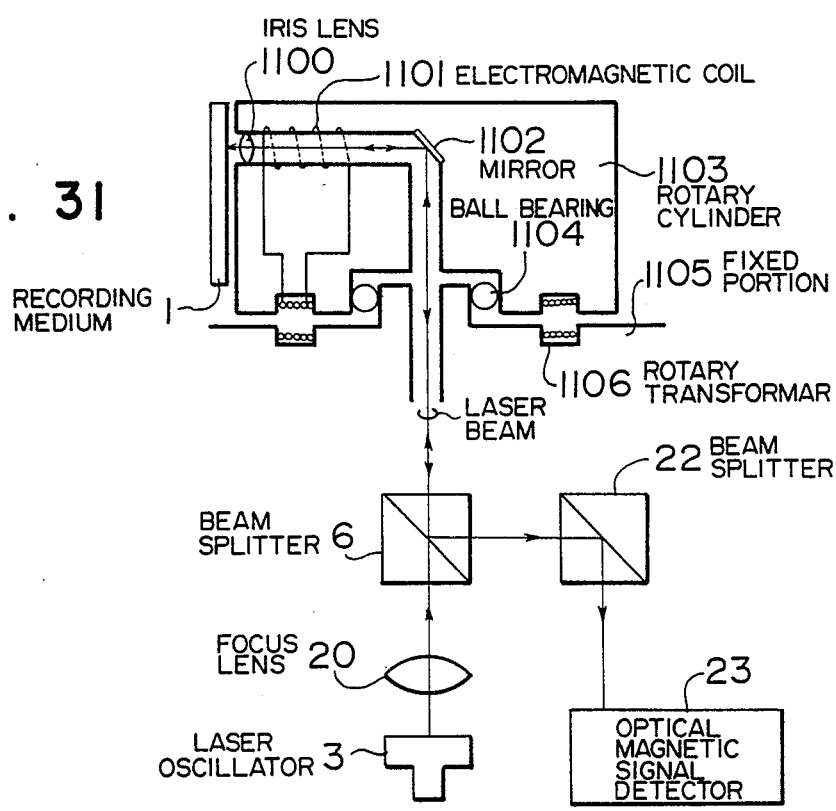
FIG. 31 is a block diagram showing an embodiment of the present invention using a rotary cylinder.

FIG. 31 shows an embodiment of an optical magnetic recording and reproducing apparatus in which the amount of information per track is increased by recording and reproducing information slantly with respect to the traveling direction of the recording medium using a rotary cylinder.

A feature of FIG. 31 is that a rotary cylinder having a hollow rotation axis is used. As a result, the electromagnetic coil can be housed in the cylinder, resulting in the simplification of the apparatus.

During the recording operation, the optical beam from the laser oscillator 3 is led into a cylinder through a hollow rotary axis of the rotary cylinder. The direction of the optical path of the beam is changed by a mirror 1102 to apply the beam onto the recording medium 1 through the side face of the cylinder. At the same time, the modulation signal is transmitted to an electromagnetic coil 1101 via a rotary transformer 1106 to produce an external magnetic field for optical magnetic recording.

Figure 32:
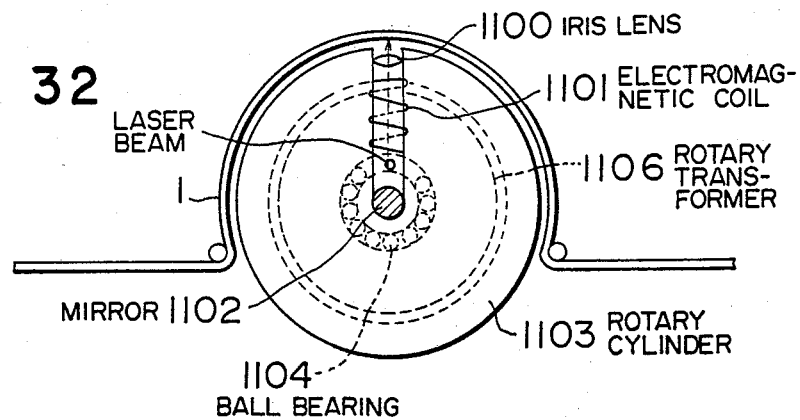
FIG. 32 is a configuration diagram showing the relationship between the rotary cylinder and the recording medium.

The recording medium is wound round along the side face of the cylinder with a predetermined angle as shown in FIG. 32.

By the above described configuration, it is possible to record signals slantly with respect to the recording medium. Accordingly, the amount of information per track can be increased.

During the reproduction, the optical path of the laser beam is similar to that of recording operation. The reflected light from the recording medium is branched from the optical path of the radiated light by a beam splitter 6 of FIG. 31 to be detected by an optical magnetic detector 23.

Figure 33A:
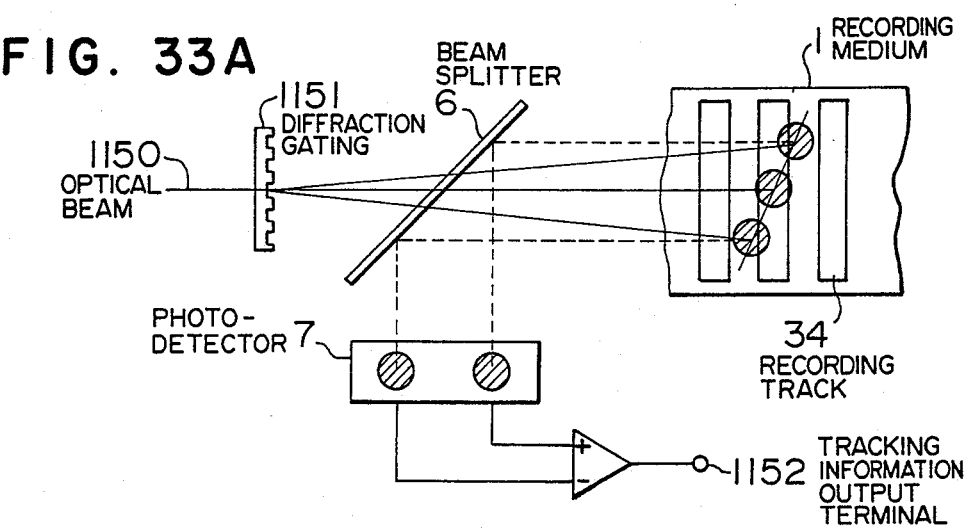
FIGS. 33A, 33B and 33C are schematic diagrams showing a tracking control method according to the present invention.

FIG. 33 shows an example of tracking control in an optical magnetic recording and reproducing apparatus according to the present invention. In FIG. 33, an optical beam 1150, a diffraction gating 1151 for dividing one optical beam into three beams, and an output terminal 1152 for sending out the tracking error information to a tracking servocontrol circuit are illustrated. Other numerals denote the same components as those of FIG. 1.

During reproduction, the optical beam 1150 is divided into three optical beams by the diffraction gating 1151 to be applied onto a recording track 34 on the recording medium 1. Among three optical beams, two optical beams, i.e., upper and lower optical beams are used for tracking control. The upper and lower optical beams are reflected by the recording medium 1 to be led into the photodetector 7 via the beam splitter 6. Signals proportionate to the intensities of the two reflected optical beams are detected in the photodetector 7 to be supplied to a differential amplifier. In this way, the tracking signal is detected at the output of the differential amplifier and sent out from the output terminal 1152.

Figure 33B:
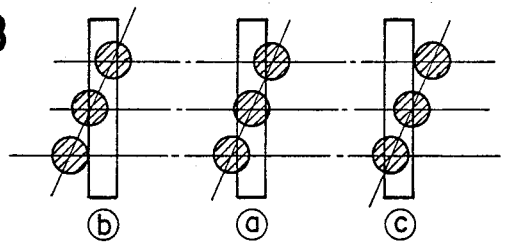
Figure 33C:
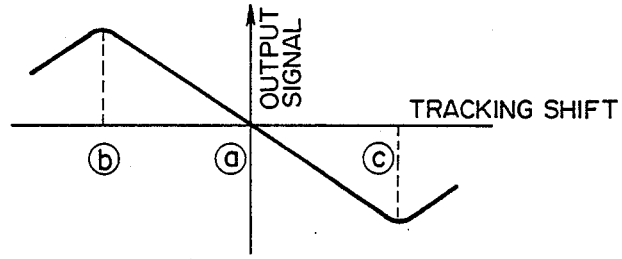

The principle of the tracking control signal detection will now be described by referring to FIGS. 33B and 33C.

When the central optical beam among three optical beams is located on the track, the reflected outputs of two remaining optical beams become equal. The tracking control output signal can be represented as a in FIG. 33C. If the tracking is shifted to the left or right, there occurs a difference between the outputs of the reflected light as represented by b or c . Accordingly, the tracking error can be detected.

FIG. 34 shows another embodiment of tracking control of the optical magnetic recording and reproducing apparatus.

In FIG. 34, numerals 1153 and 1154 denote photodetectors I and II, respectively. Numeral 1155 denotes a beam spot reflected by the recording medium and led to the photodetector.

Figure 34A:
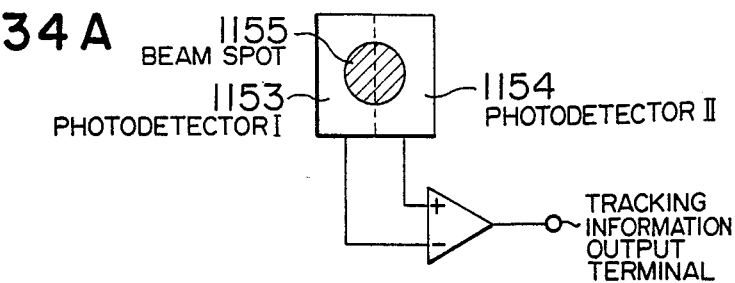
FIGS. 34A, 34B and 34C are schematic diagrams showing another tracking control method.
Figure 34B:
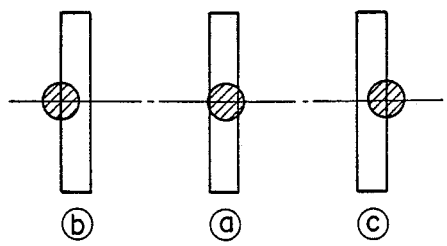
Figure 34C:
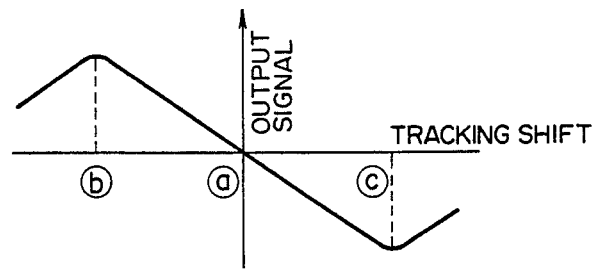

As shown in FIG. 34A, beams are led to the photodetector composed of two bisected detectors I and II located at the left and right side. Signals corresponding to respective intensities are supplied from the detectors I and II to the differential amplifier. In FIGS. 34B and 34C, state a indicates that the beam scans the center of the track. States b and c indicate that the beam has been shifted to the left and right, respectively. When the tracking is shifted, the reflected light intensity thus becomes strong. And the difference is detected to produce the tracking control signal.

Alternatively, the so-called wobbling method may also be used. In the wobbling method, the beam is slightly vibrated to the left and right with respect to the track to apply the amplitude modulation to the carrier of the photodetector output and the envelope of the modulated wave is detected to effect tracking control.

Figure 35:
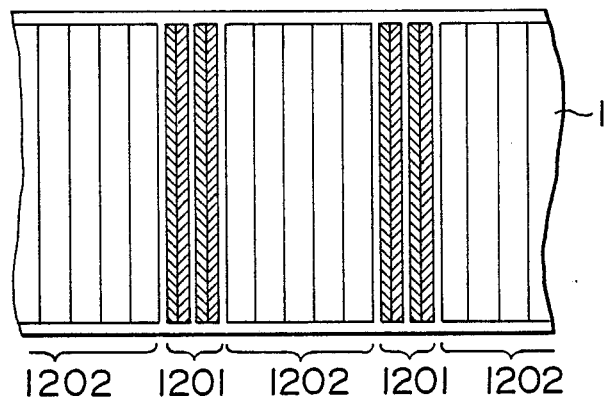
FIG. 35 is a pattern diagram of a track exclusively used for tracking control in still another tracking control method.

Another embodiment of tracking control will now be simply described by referring to FIG. 35. In FIG. 35, numeral 1201 denotes a track exclusively used for tracking control, and numeral 1202 denotes a recording track for information signal. As shown in FIG. 35, the tracks 1201 exclusively used for tracking control and information signal recording tracks 1202 are alternately disposed by several tracks. During reproduction, tracking control is effected on the basis of the method shown in FIG. 12 using the tracks 1201 exclusively used for tracking control. Thereafter, the digital signals are recorded. In order to effect the signal reproduction and tracking control in time division scheme in this embodiment, a pilot signal for identifying the track 1201 exclusively used for tracking control must be recorded on the start point of the track 1201 exclusively used for tracking control or on the start point of the digital signal recording track 1202. In FIG. 35, two tracks are disposed as tracks 1201 exclusively used for tracking control, and five tracks are disposed as digital signal recording tracks 1202. However, the present invention is not limited to this example.

Figure 36:
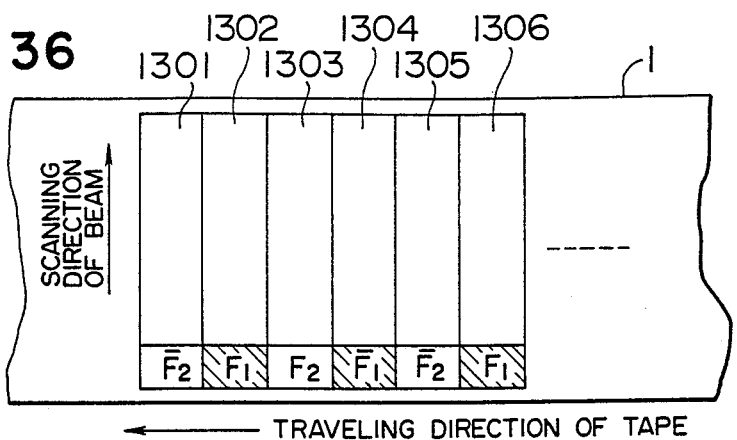
FIG. 36 is a pattern diagram of a track used in still another tracking control method.

Further, another embodiment of tracking will now be described by referring to FIGS. 36 to 38. FIG. 36 shows the recording pattern on the recording medium 1. In an entrance section of the beam applied to the recording medium, tracking signals $\bar{F}_2$, $F_1$, $F_2$, $\bar{F}_1$, $\bar{F}_2$ and $F_1$ are recorded on tracks 1301 to 1306, respectively. The signals $F_1$ and $F_2$ are signals having frequencies $f_1$ and $f_2$, respectively. The signals $\bar{F}_1$ and $\bar{F}_2$ are signals having phase difference of 180° with respect to the signals $F_1$ and $F_2$.

Figure 37:
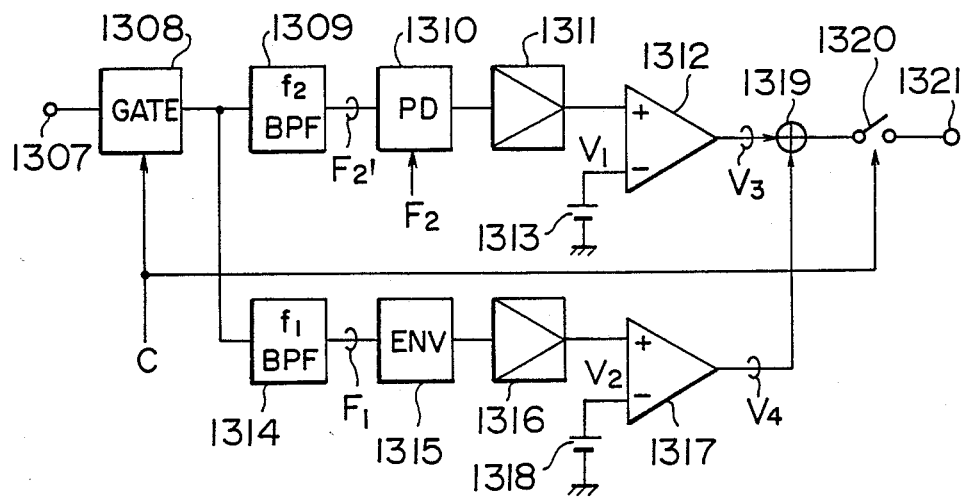
FIG. 37 is a circuit diagram of a tracking control circuit.

FIG. 37 shows a concrete circuit. In FIG. 37, a reproduction signal input terminal 1307, a gate circuit 1308, a bandpass filter 1309 of frequency $f_2$, a phase detection circuit 1310, an amplifier 1311, a comparator 1312, a reference voltage source 1313, a bandpass filter 1314 of $f_1$, an amplitude detection circuit 1315, an amplifier 1316, a comparator 1317, a reference voltage source 1318, an adder 1319, a hold circuit 1320, and an output terminal 1321 are illustrated. The reproduced signal supplied from the input terminal 1307 is led to the gate circuit 1308 to gate the sections with $F_1$ and $F_2$ recorded thereon. Details will be described later by referring to FIG. 38. In the present embodiment, the tracking information is obtained from the tracks 1302, 1304 and 1306 disposed every other track as represented by the shaded regions of FIG. 36. When the track 1302 is reproduced, for example, the beam extends over the tracks 1301 and 1303 centering around the track 1302. The signals $F_2$ and $\bar{F}_2$ respectively recorded on the tracks 1301 and 1303 have phase difference of 180°. When the signals $F_2$ and $\bar{F}_2$ are reproduced with the same amount, therefore, the output of the BPF 1309 has no signals. If there occurs a difference between $F_2$ and $\bar{F}_2$, however, a signal $F_2'$ having the frequency $f_2$ is produced at the output of the BPF 1309. In the phase detector 1310, the signal $F_2'$ is phase-detected with the same signal as $F_2$ during recording having the frequency $f_2$. Depending upon whether the phase of $F_2'$ is the same as that of $F_2$ or 180° from that of $F_2$, the output level of the phase detector 1310 varies. The output of the phase detector 1310 is amplified in the amplifier 1311 and then compared with threshold voltage $V_1$ in the comparator 1312. The output $V_3$ of the comparator 1312 is supplied to the adder 1319. That is to say, the signal $V_3$ activates tracking so that the left and right adjacent signals may balance. In order to make the scanning beam properly scan the track with $F_1$ recorded thereon the signal $F_1$ having the frequency $f_1$ is extracted by the BPF 1314 and then detected by the amplitude detection circuit 1315. After the detected signal is sufficiently amplified in the amplifier 1316, it is compared with threshold voltage $V_z$. The comparison result is supplied to the adder 1319. If the beam scans the track 1303 with $F_2$ recorded thereon in the gate section, the output of the amplitude detector 1315 comprises only crosstalk components from the adjacent tracks 1302 and 1304 and is minute. When the beam is shifted by one track, the tracking circuit composed of 1309 to 1312 does not operate. Accordingly, the output $V_4$ of the comparator 1317 is added to the above described signal $V_3$ in the adder 1319, and the traveling speed of tape is so forcibly varied by the output of the adder 1319 as to cause a shift of one track. The output of the adder 1319 is supplied to the hold circuit 1320. Excepting the gate section, the previous information is held in the hold circuit 1320 and sent out to the terminal 1321 to control the capstan motor for varying the traveling speed of the tape.

Figure 38:
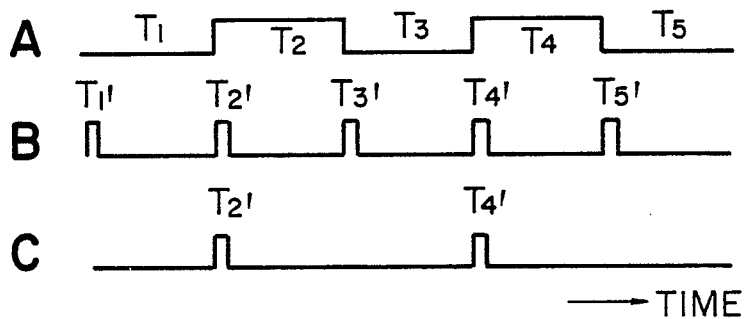
FIG. 38 is a waveform diagram showing waveforms at various parts of FIG. 37.

FIG. 38 shows timing of the gate pulse and hold pulse. From a signal A assuming the high level during tracks 1302, 1304 and 1306 and a signal B assuming the high level during sections with $F_1$, $F_2$, $\overline{F}_1$ or $\overline{F}_2$ recorded thereon, a signal C assuming the high level during sections with $F_1$ or $\overline{F}_1$ recorded thereon is produced as the gate pulse or the hold pulse.

In the above description, the tracking signal is time-division multiplexed on the head portion of the track. However, the tracking signal may be time-division multiplexed on a different portion of the track or on several portions of the track. Otherwise, the tracking signal may be frequency multiplexed over the entire track.

In summary, the optical magnetic recording and reproducing apparatus according to the present invention has advantages as listed below.

(1) Since the information can be recorded on a recording medium having a large recording area such as magnetic tape, the recording time can be prolonged.

(2) Since the recording track can be made nearly perpendicular to the lengthwise direction of the recording medium, manipulation such as head search can be improved.

(3) Since the tracking control can be effected by rotating the polygonal rotary scanner or the optical beam generator around an arbitrary axis, stable tracking is obtained in any mode.

(4) Since the tracking control can be effected by rotating the cylindrical tracking lens around an axis perpendicular to the recording medium face, tracking is easily attained in any mode.

(5) Since the recording operation can be effected concurrently with the erasing operation by making the erasing light beam precede the recording light beam and inverting the sense of the magnetic field in the track pattern track by track, the problem of incomplete erasing is eliminated.

(6) Since the still reproduction or fine slow reproduction can be effected without repetitively applying the laser beam onto a particular point on the recording medium owing to the provision of the memory unit, destruction of the recorded information due to a temperature rise can be prevented.

(7) Since the unrecordable and unreproducible portion near the vertex of the polygonal rotary scanner can be assigned to a signalless section owing to the provision of the memory unit, missing information can be prevented.

(8) Since the main body of the optical magnetic recording and reproducing apparatus can be separated from the signal processing portion, not only one kind of information signal but also many kinds of information signals can be recorded.

(9) Since the optical path correction lens can be eliminated by making the recording medium travel along a concave curve, the mechanical system and the control system can be simplified.

(10) Since the recording medium, lens, rotary scanner and beam splitter can be disposed in the same plane by forming the rotary scanner as a polygonal truncated pyramid, the set can be made thin.

(11) Since the focus servo is attained by changing the position of the holding face of the recording medium without moving the component of the optical system provided that the recording medium itself is soft material such as optical magnetic tape, the configuration of the control system can be simplified.

(12) Since the control operation can be effected while automatically correcting the optimum parameter of the control unit so as to effect the optimum traveling control provided that the characteristics of the object to be controlled have changed, a change in the response of the control system can be prevented.

(13) Since the electromagnetic coil can be housed into a cylinder by using a cylinder having a hollow rotation axis, the size of the apparatus can be reduced.

What is claimed is:

1. An optical magnetic recording and reproducing apparatus comprising:
    optical beam scanning means for scanning a recording medium with an optical beam and forming a track having a predetermined angle with respect to a traveling direction of said recording medium;
    means for applying a magnetic field onto said recording medium; and
    means for generating said optical beam;
    wherein said optical beam scanning means comprises a rotating body having a plurality of reflex faces and includes means for rotating the rotating axis of said rotating body around at least two arbitrary axes perpendicular to said rotating axis, and wherein said optical beam generating means includes means for making the optical beam axis move in the traveling direction of the recording medium.

2. An optical magnetic recording and reproducing apparatus according to claim 1, wherein said optical beam scanning means includes an optical element disposed at a predetermined angle with respect to the traveling direction of the recording medium, and wherein said optical element has a lengthwise direction and does not have refractive power in the lengthwise direction thereof and has refractive power in a direction substantially perpendicular to the lengthwise direction thereof.

3. An optical magnetic recording and reproducing apparatus comprising:
    optical beam scanning means for scanning a recording medium with an optical beam and forming a track having a predetermined angle with respect to a traveling direction of said recording medium;
    means for applying a magnetic field onto said recording medium; and
    means for generating said optical beam including means for making the optical beam axis move in the traveling direction of said recording medium;
    wherein memory means for storing information is also provided and said optical beam scanning means includes a rotating body having a plurality of reflex faces; and wherein the information signal is so converted to be recorded and reproduced that the resultant signal may have a constant blanking period during changeover of said reflex face.

4. An optical magnetic recording and reproducing apparatus comprising:

optical beam scanning means for scanning a recording medium with an optical beam and forming a track having a predetermined angle with respect to a traveling direction of said recording medium;

means for applying a magnetic field onto said recording medium; and means for generating said optical beam;

wherein said optical beam scanning means includes two rotating bodies respectively having a plurality of reflex faces, and wherein said two rotating bodies are disposed with a relative shift and said relative shift is equal to half of the center angle of one reflex face.

5. An optical recording and reproducing method comprising:

a step for scanning a recording medium with an optical beam and forming a track having a predetermined angle with respect to a traveling direction of said recording medium;

a step for applying a magnetic field onto said recording medium; and a step for generating said optical beam;

wherein said optical beam scanning step includes a step for rotating the rotation axis of a rotating body having a plurality of reflex faces around at least two arbitrary axes perpendicular to said rotating axis, and wherein said optical beam generating step includes a step for making the optical beam axis move in the traveling direction of the recording medium.

6. An optical magnetic recording and reproducing method according to claim 5, wherein said optical beam scanning step includes a step for providing an optical element disposed at a predetermined angle with respect to the traveling direction of the recording medium, and wherein said optical element has a lengthwise direction and does not have refractive power in the lengthwise direction thereof and has refractive power in a direction substantially perpendicular to the lengthwise direction thereof.

7. An optical magnetic recording and reproducing method comprising:

a step for scanning a recording medium with an optical beam and forming a track having a predetermined angle with respect to a traveling direction of said recording medium;

a step for applying a magnetic field onto said recording medium; and a step for generating said optical beam and for making the optical beam axis move in the traveling direction of said recording medium;

wherein a memory step for storing information is also provided and said optical beam scanning step includes a step for providing a rotating body having a plurality of reflex faces, and also includes a step for converting the information signal so as to be provided with a constant blanking period during changeover of said reflex face and for recording and reproducing the converted signal.

8. An optical magnetic recording and reproducing method comprising:

a step for scanning a recording medium with an optical beam and forming a track having a predetermined angle with respect to a traveling direction of said recording medium;

a step for applying a magnetic field onto said recording medium; and a step for generating said optical beam;

wherein said optical beam scanning step includes a step for disposing two rotating bodies respectively having a plurality of reflex faces and for providing said two rotating bodies with a relative shift equal to half of the center angle of one reflex face.

9. An optical magnetic recording and reproducing apparatus comprising:

optical beam scanning means for scanning a recording medium with an optical beam and forming a track having a predetermined angle with respect to a traveling direction of said recording medium;

means for applying a magnetic field onto said recording medium; and means for generating said optical beam including means for making the optical beam axis move in the traveling direction of said recording medium;

wherein said optical beam scanning means comprises a rotating body having a plurality of reflex faces and includes means for rotating the rotating axis of said rotating body around at least two arbitrary axes perpendicular to said rotating axis.

* * * * *